(12) United States Patent
Musgrave et al.

(10) Patent No.: US 12,233,674 B2
(45) Date of Patent: *Feb. 25, 2025

(54) BRACKET FOR MOUNTING A TIRE PRESSURE SENSOR

(71) Applicant: Pressure Systems International, LLC, San Antonio, TX (US)

(72) Inventors: Tim Musgrave, San Antonio, TX (US); Mark Kevin Hennig, Corpus Christi, TX (US); Charles Blanton Robertson, Port Aransas, TX (US); James Raymond Snider, San Antonio, TX (US); Jonathan Gravell, San Antonio, TX (US)

(73) Assignee: Pressure Systems International, LLC, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/226,745

(22) Filed: Jul. 26, 2023

(65) Prior Publication Data

US 2024/0025218 A1    Jan. 25, 2024

Related U.S. Application Data

(63) Continuation of application No. 17/562,767, filed on Dec. 27, 2021, now Pat. No. 11,738,611, which is a
(Continued)

(51) Int. Cl.
*B60C 23/00* (2006.01)
*B60C 23/04* (2006.01)
(Continued)

(52) U.S. Cl.
CPC .......... *B60C 29/064* (2013.01); *B60C 23/007* (2013.01); *B60C 23/009* (2013.01);
(Continued)

(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/06; B60C 23/043; B60C 23/0452;
(Continued)

(56) References Cited

U.S. PATENT DOCUMENTS 839,626 A    12/1906 Nielsen
1,072,907 A    9/1913 Brooks
(Continued)

*Primary Examiner* — Andre J Allen
(74) *Attorney, Agent, or Firm* — Pizarro Allen PC

(57) ABSTRACT

An inflation manifold connected to dual pneumatic tires by air hoses provides a central location for tire inflation and location of pressure sensors. A hose block connected to dual pneumatic tires by air hoses provides a central location for location of pressure sensors. The pressure sensors may be TPMS sensors or a combination of TPMS sensor and pressure gauge.

10 Claims, 27 Drawing Sheets

Related U.S. Application Data continuation of application No. 16/343,667, filed as application No. PCT/US2017/057480 on Oct. 19, 2017, now Pat. No. 11,685,201.

(60) Provisional application No. 62/539,411, filed on Jul. 31, 2017, provisional application No. 62/434,982, filed on Dec. 15, 2016, provisional application No. 62/410,082, filed on Oct. 19, 2016, provisional application No. 62/410,302, filed on Oct. 19, 2016.

(51) Int. Cl.
*B60C 29/02* (2006.01)
*B60C 29/06* (2006.01)
*B60S 5/04* (2006.01)

(52) U.S. Cl.
CPC .......... *B60C 23/0496* (2013.01); *B60C 29/02* (2013.01); *B60S 5/043* (2013.01)

(58) Field of Classification Search
CPC ............... B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/003366; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22
USPC ................................................. 73/146–146.8
See application file for complete search history.

(56) References Cited

U.S. PATENT DOCUMENTS

| | | |
|---|---|---|
| 1,083,847 A | 1/1914 | Mcdowell |
| 1,112,596 A | 10/1914 | Burggraf, Jr. |
| 1,165,057 A | 12/1915 | Bayly |
| 1,176,907 A | 3/1916 | Kraft |
| 1,205,504 A | 11/1916 | Bearce |
| 1,297,239 A | 3/1919 | Potter |
| 1,800,780 A | 4/1931 | Hurtley |
| 2,107,405 A | 2/1938 | Williams |
| 2,168,690 A | 8/1939 | John |
| 2,177,042 A | 10/1939 | Paul |
| 2,251,713 A | 8/1941 | Meiser |
| 2,633,148 A | 3/1953 | Kelly |
| 2,685,906 A | 8/1954 | Williams |
| 2,854,018 A | 9/1958 | Kilmarx, Jr. |
| 3,235,684 A | 2/1966 | Jordan |
| 3,276,417 A | 10/1966 | Flowers |
| 3,276,503 A | 10/1966 | Kilmarx |
| 3,350,113 A | 10/1967 | Graham |
| 3,954,281 A | 5/1976 | Juergens |
| 4,235,185 A | 11/1980 | Byram |
| 4,387,931 A | 6/1983 | Bland |
| 4,418,737 A | 12/1983 | Goodell |
| 4,464,929 A | 8/1984 | Willis |
| 4,685,501 A | 8/1987 | Williams |
| 4,700,763 A | 10/1987 | Williams |
| 4,883,106 A | 11/1989 | Schultz |
| 5,111,762 A | 5/1992 | Frangiamore |
| 5,158,122 A | 10/1992 | Moffett |
| 5,287,906 A | 2/1994 | Stech |
| 5,377,736 A | 1/1995 | Stech |
| 5,398,743 A | 3/1995 | Bartos |
| 5,452,753 A | 9/1995 | Olney |
| 5,482,358 A | 1/1996 | Kuck |

(56) References Cited

U.S. PATENT DOCUMENTS

| | | |
|---|---|---|
| 5,560,792 A | 10/1996 | Anthony |
| 5,584,949 A | 12/1996 | Ingram |
| 5,694,969 A | 12/1997 | DeVuyst |
| 5,707,186 A | 1/1998 | Gobell |
| 5,769,979 A | 6/1998 | Naedler |
| 5,807,445 A | 9/1998 | Hoffmann |
| 5,868,881 A | 2/1999 | Bradley |
| 5,947,172 A | 9/1999 | Glotin |
| 6,105,645 A | 8/2000 | Ingram |
| 6,131,631 A | 10/2000 | Bradley |
| 6,145,559 A | 11/2000 | Ingram |
| 6,167,900 B1 | 1/2001 | Laird |
| 6,269,691 B1 | 8/2001 | Sowatzke |
| 6,325,123 B1 | 12/2001 | Gao |
| 6,325,124 B1 | 12/2001 | Colussi |
| 6,394,556 B1 | 5/2002 | Ingram |
| 6,401,743 B1 | 6/2002 | Naedler |
| 6,425,427 B1 | 7/2002 | Stech |
| 6,435,238 B1 | 8/2002 | Hennig |
| 6,484,774 B1 | 11/2002 | Naedler |
| 6,668,888 B1 | 12/2003 | Beesley |
| 6,772,812 B1 | 8/2004 | Hamilton |
| 6,892,778 B2 | 5/2005 | Hennig |
| 6,938,658 B2 | 9/2005 | Jarrett |
| 6,993,962 B1 | 2/2006 | Ko |
| 7,191,796 B1 | 3/2007 | Rehmert, Jr. |
| 7,273,082 B2 | 9/2007 | White |
| 7,302,979 B2 | 12/2007 | Davison |
| 7,404,412 B2 | 7/2008 | Milanovich |
| 7,530,379 B1 | 5/2009 | Becker |
| 7,669,465 B2 | 3/2010 | Becker |
| 7,690,412 B1 | 4/2010 | Jenkinson |
| 7,896,045 B2 | 3/2011 | Solie |
| 7,963,159 B2 | 6/2011 | Ingram |
| 7,992,610 B2 | 8/2011 | Collet |
| 8,028,732 B1 | 10/2011 | Ingram |
| 8,146,413 B1 | 4/2012 | Grace |
| 8,191,594 B2 | 6/2012 | Saadat |
| 8,931,534 B2 | 1/2015 | Eaton |
| 8,973,633 B2 | 3/2015 | Wilson |
| 10,086,660 B1 | 10/2018 | Berkness |
| 10,596,862 B1 | 3/2020 | Cappello |
| 11,685,201 B2 * | 6/2023 | Musgrave ............ B60C 29/064 152/427 |
| 2002/0139288 A1 | 10/2002 | Evans |
| 2003/0024463 A1 | 2/2003 | Evans |
| 2003/0071513 A1 | 4/2003 | Elkow |
| 2004/0000364 A1 | 1/2004 | Hennig |
| 2004/0155516 A1 | 8/2004 | Colussi |
| 2004/0173296 A1 | 9/2004 | White |
| 2005/0133134 A1 | 6/2005 | Ingram |
| 2005/0161136 A1 | 7/2005 | Hayes |
| 2008/0106394 A1 | 5/2008 | Huang |
| 2008/0149244 A1 | 6/2008 | Liao |
| 2008/0284576 A1 | 11/2008 | Zhou |
| 2009/0266460 A1 | 10/2009 | Resare |
| 2009/0283190 A1 | 11/2009 | Padula |
| 2010/0180678 A1 | 7/2010 | Casner |
| 2011/0175716 A1 | 7/2011 | Medley |
| 2012/0024445 A1 | 2/2012 | Wilson |
| 2012/0218095 A1 | 8/2012 | Zhou |
| 2013/0199685 A1 | 8/2013 | Nelson |
| 2013/0306192 A1 | 11/2013 | Hennig |
| 2014/0196812 A1 | 7/2014 | Musgrave |
| 2014/0261941 A1 | 9/2014 | Knapke |
| 2014/0271261 A1 | 9/2014 | Boelryk |
| 2015/0075672 A1 | 3/2015 | Trostle |
| 2015/0258863 A1 | 9/2015 | Gillen |
| 2016/0176243 A1 | 6/2016 | Lin |
| 2016/0250901 A1 | 9/2016 | Hennig |
| 2016/0288590 A1 | 10/2016 | Hennig |
| 2018/0072111 A1 | 3/2018 | Cappello |
| 2018/0126805 A1 | 5/2018 | Ramsubagh |
| 2018/0186198 A1 | 7/2018 | Zhou |
| 2018/0281532 A1 | 10/2018 | Ramsubagh |
| 2018/0304699 A1 | 10/2018 | Castriotta |
| 2019/0359015 A1 | 11/2019 | Ramsubagh |
| 2022/0032694 A1 | 2/2022 | Reilly |
| 2022/0118803 A1 | 4/2022 | Musgrave |

* cited by examiner

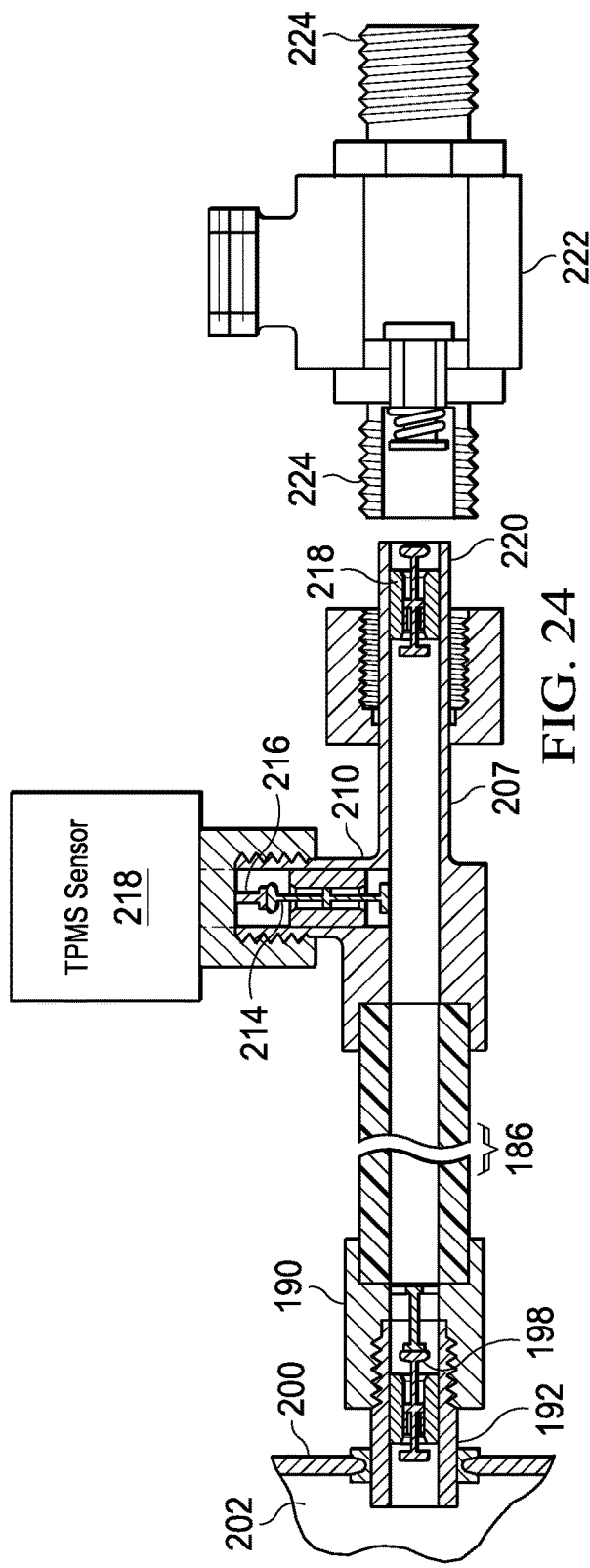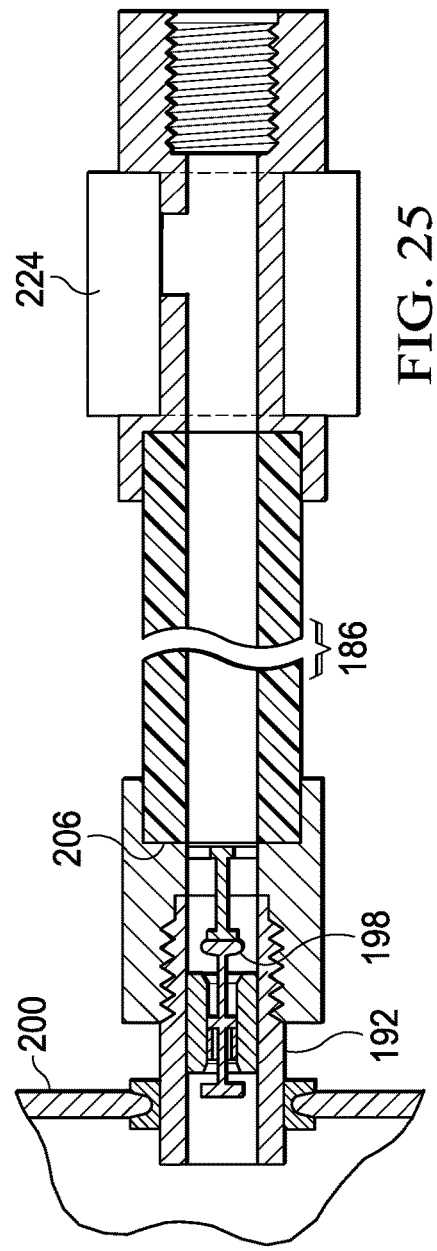

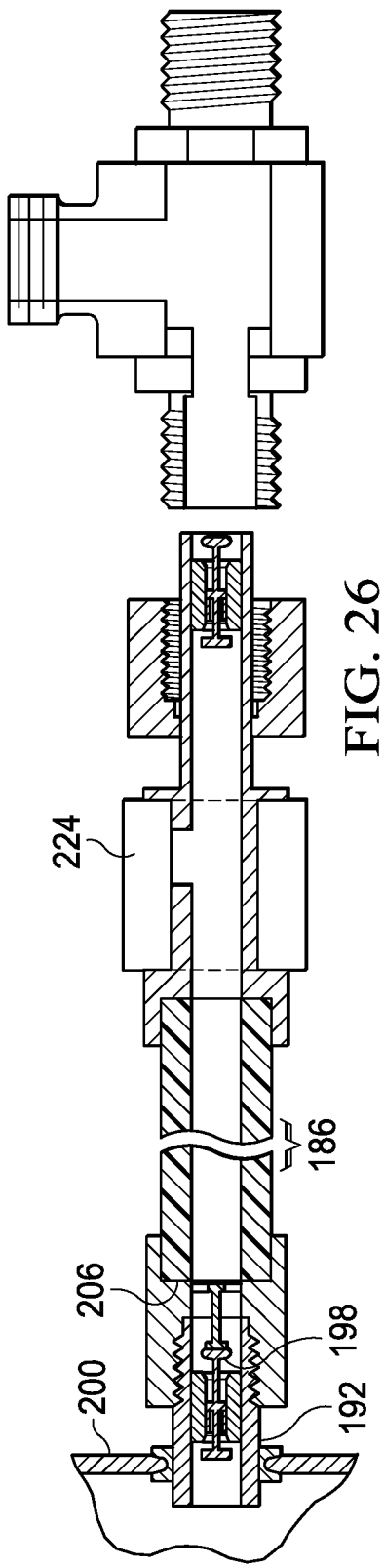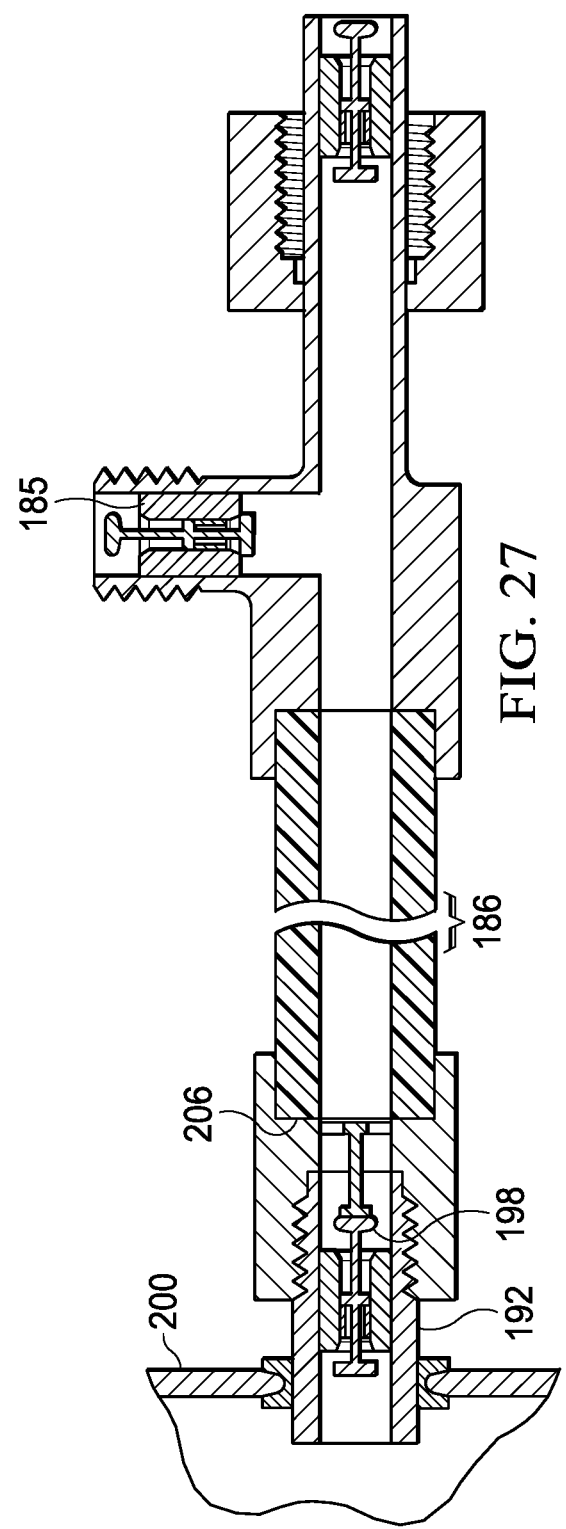

BRACKET FOR MOUNTING A TIRE PRESSURE SENSOR

CROSS-REFERENCE TO RELATED APPLICATION

This application is a continuation of U.S. application Ser. No. 17/562,767 filed Dec. 27, 2021 entitled "INFLATION MANIFOLD" and now issued as U.S. Pat. No. 11,738,611, which is a continuation of U.S. application Ser. No. 16/343,667 filed Apr. 19, 2019 entitled "INFLATION MANIFOLD", now issued as U.S. Pat. No. 11,658,201, which is a U.S. national stage entry of International Patent Application No. PCT/US2017/057480 entitled "INFLATION MANIFOLD" filed Oct. 19, 2017, which claims priority to U.S. Provisional Patent Application No. 62/539,411 entitled "Tire Pressure Monitoring Sensor with Gauge" filed Jul. 31, 2017, U.S. Provisional Patent Application No. 62/434,982 entitled "Inflation Manifold" filed Dec. 15, 2016, U.S. Provisional Patent Application No. 62/410,302 entitled "Hose Support for TPMS System" filed Oct. 19, 2016, and U.S. Provisional Patent Application No. 62/410,082 entitled "Inflation Manifold" filed Oct. 19, 2016.

FIELD

This application relates generally to vehicle tire inflation and tire pressure monitoring.

BACKGROUND

Automatic tire inflation systems (ATIS) may be used to control vehicle tire pressure by adding air to the vehicle's tires without need for a human operator to inflate the tires from an air pressure source external to the vehicle, such as maintenance shop air supply. However, for vehicles that have dual tires and lack an automatic tire inflation system, access to the tire valves for the inside tire can be difficult and messy. Often, the openings or voids in dual wheels do not allow an arm to easily reach through with an air hose, if at all. Or, the wheel end may have accumulated dirt and grease, thus discouraging a busy vehicle operator from properly inflating the inner tire. And, simply locating the tire valve on the inner tire can take up precious time that the vehicle operator would rather spend driving the vehicle.

Vehicles may also employ tire pressure monitoring systems (TPMS) to monitor tire pressure using electronic sensors at the wheel end. ATIS and TPMS may be used together or separately. TPMS sensors are generally mounted to the tire stem or in the tire cavity or to each wheel. Thus, when a tire is changed, the TPMS sensor may be lost, damaged or simply not re-installed. And, for TPMS sensors that identify a particular wheel or location on the truck or trailer, failure to replace the TPMS sensor or installing the TPMS sensor on the wrong tire may result in erroneous data being transmitted to the TPMS system.

Yet another inefficiency in automatic tire inflation systems is often a lack of access to information from the TPMS when away from an in-cab display. The driver or a maintenance person may need such information to make informed decisions or to make expedient repairs. As most inflation systems do not dispose any gauge or other display at the tire, significant time may be wasted traveling back and forth to an in-cab display.

Thus, there exists a need for a system that permits fast, efficient inflation of dual vehicle tires without use of an automatic tire inflation system. There also exists a need for a system that locates TPMS sensors away from the individual tire stems. There further exists a need for a TPMS that provide a pressure indication at the wheel end.

BRIEF DESCRIPTION OF THE DRAWINGS

FIG. 24 also illustrates an air hose with auxiliary port and having a TPMS sensor removably coupled thereto.

FIG. 25 illustrates an air hose having a TPMS sensor disposed in-line.

FIG. 26 also illustrates an air hose having a TPMS sensor disposed in-line.

FIG. 27 also illustrates an air hose with auxiliary port.

DETAILED DESCRIPTION

Figure 1:
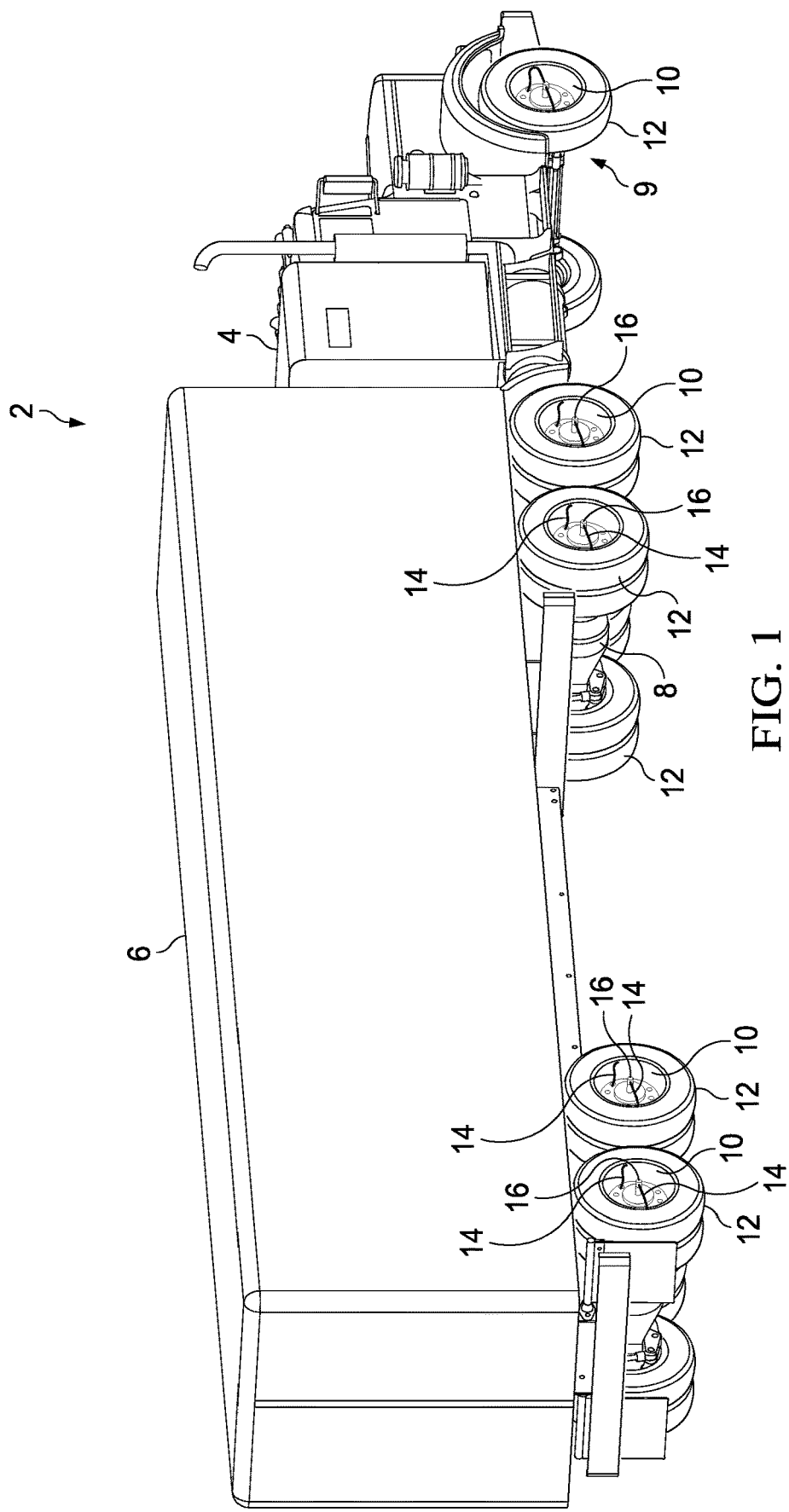
FIG. 1 illustrates an embodiment of a vehicle having a plurality of inflation manifolds mounted thereto.

As may be seen in FIG. 1, a vehicle 2 may comprise any vehicle having dual tires, such as semi-trucks, heavy-duty pickup trucks, RVs, dump trucks, and class 7 and 8 trailers, by way of example. In the embodiment of FIG. 1, the vehicle may comprise a truck 4 and a trailer 6. The truck 4 may include one or more drive axles 8 as part of the vehicle's power train. The truck 4 may further include a steer axle 9 having pivotable spindles that may provide steering capability for the vehicle 2. The trailer 6 may include one or more fixed axles (not shown). Each trailer and truck axle (other than steer axles) may have dual wheels 10 mounted at each end. A pneumatic tire 12 may be mounted to each wheel 10.

The vehicle 2 may be provided with an inflation manifold 16 that may be used to more conveniently connect the dual tires at each end of an axle to a source of pressurized air to maintain the tires at a desired air pressure. The inflation manifold 16 may connect to the valve stems of each tire using air hoses 14 in fluid communication with each tire 12 for communicating air from the air pressure source to and from the tires 12. As noted above, the disclosed inflation manifold 16 may be used with any vehicle having dual tires at the end of an axle, such as class 7 and 8 trucks, passenger trucks, cargo trucks, RVs, trailers, farm tractors, agricultural vehicles, and the like.

Figure 2:
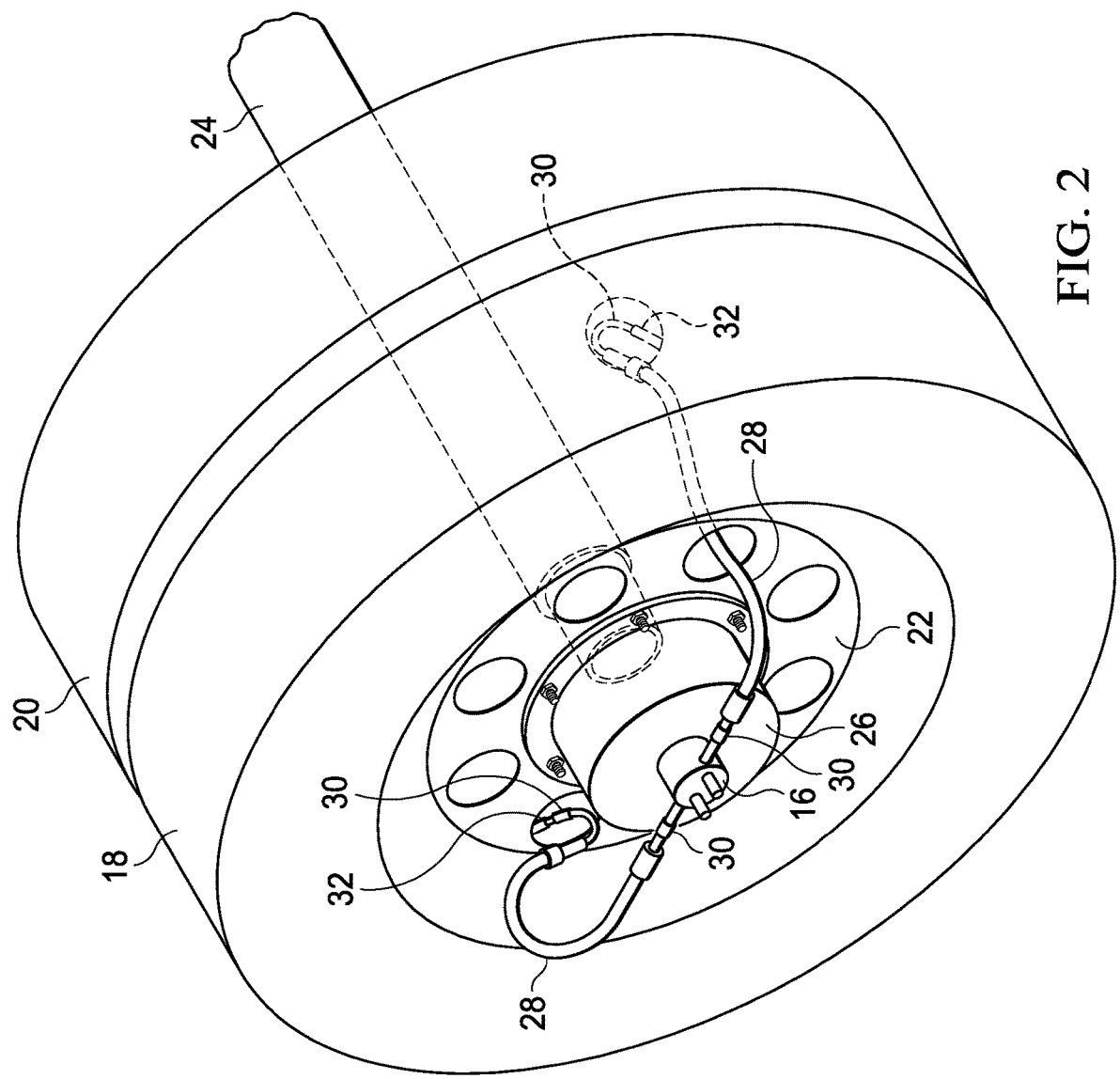
FIG. 2 illustrates an embodiment of an inflation manifold mounted to a wheel end.

One embodiment of an inflation manifold 16 is illustrated in FIG. 2. An outside tire 18 and an inside tire 20 may be mounted to wheels on one end of an axle 24. A hubcap 26 may be mounted to the outside wheel 22. The inflation manifold may be mounted to the hubcap. The inflation manifold may be placed in sealed fluid communication with the tires through air hoses 28. Each air hose may be provided with a connector 30 at each end that permits attachment of the air hose from the inflation manifold to the tire valve stem 32.

Figure 3:
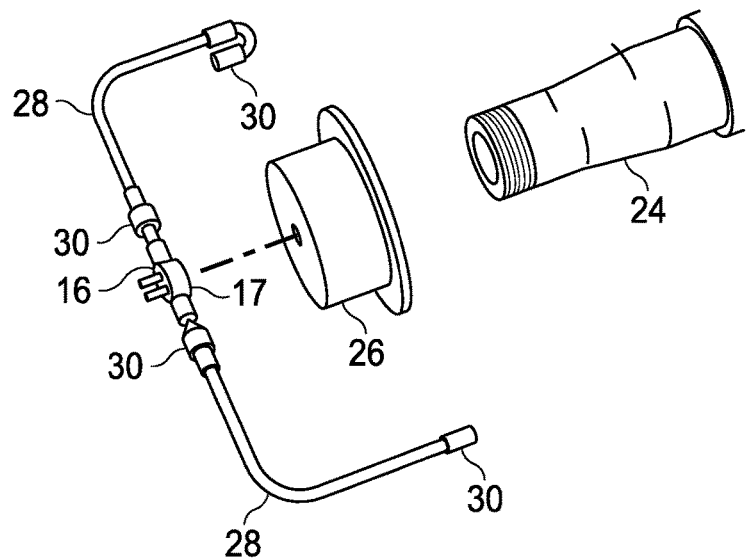
FIG. 3 illustrates mounting of an inflation manifold on a hubcap.

In some embodiments, the inflation manifold may be mounted to the hubcap in the same manner that a rotary air connection of an automatic tire inflation system might be mounted. As may be seen in the embodiment of FIG. 3, for example, the inflation manifold may be configured to allow such mounting, such as by including a threaded post 17 that may be screwed into the hubcap. In other embodiments, the inflation manifold may be bolted or screwed to the hubcap, or glued, or removably mounted using any suitable fastener, such as a hook-and-loop fastener. In yet other embodiments, the inflation manifold may be integrated into the hubcap, or configured to replace all or part of a hubcap sight glass, or configured as a ring that may be disposed under the hubcap sight glass. In further embodiments, the inflation manifold may be mounted to any other part of the wheel-end, such as to the wheel or hub. In yet other embodiments, the inflation manifold may be mounted to a bracket attached to the wheel end.

Figure 4:
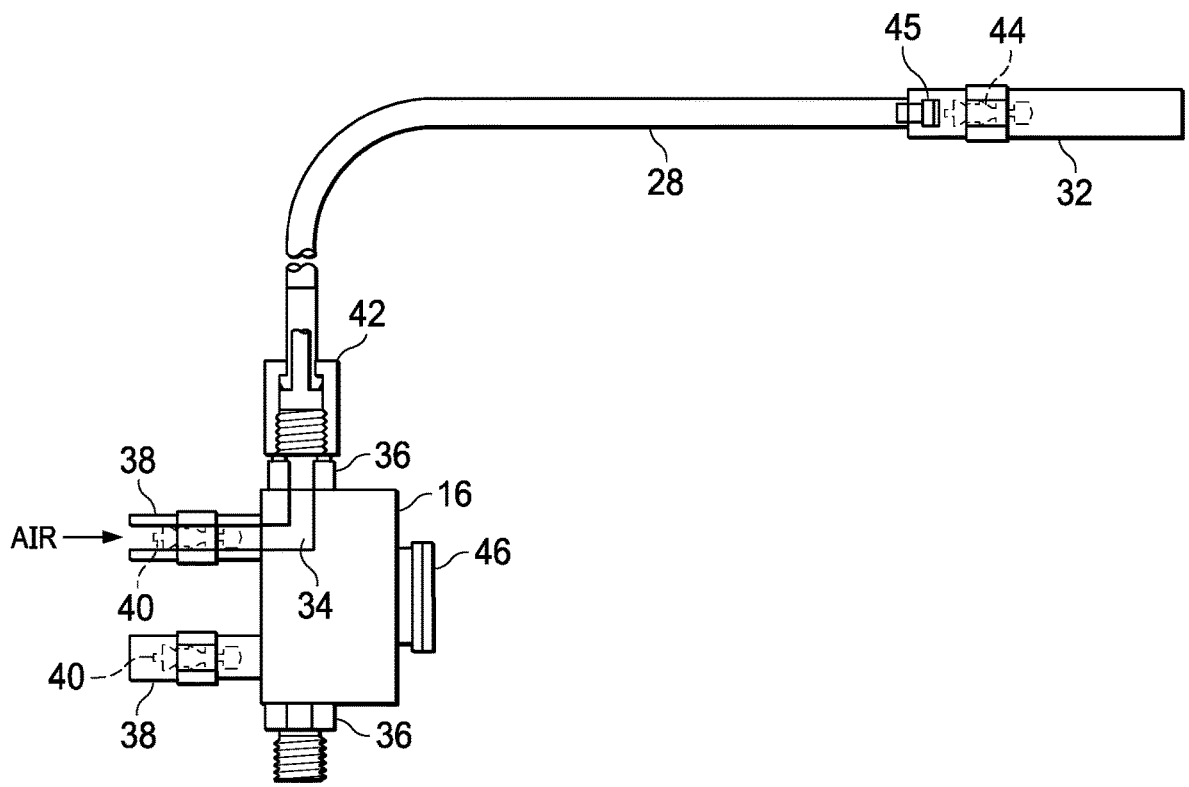
FIG. 4 illustrates an embodiment of an inflation manifold having a valve in an inflation fitting.

One embodiment of an inflation manifold is illustrated in FIG. 4. An inflation manifold may include a fluid channel 34 corresponding to each tire. A hose fitting 36 may be disposed at one end of the fluid channel. An inflation fitting 38 may be disposed at the other end of the fluid channel. In some embodiments, a one-way check valve 40, such as a Schrader® valve, may be mounted in the inflation fitting to permit air to flow from an air pressure source through the inflation fitting into the fluid channel. A tire pressure gauge may also be temporarily coupled to the inflation fitting so as to open the valve, thus allowing the tire pressure to be checked. An air hose 28 may be removably connected to the hose fitting by any suitable connector, such as a knurled nut 42 that may be screwed onto the hose fitting. In some embodiments, the air hose 28 may directly couple to the inflation manifold 16. In such embodiments, the air hose may simply comprise a threaded post, such as an ⅛ NPT fitting, that may thread into the inflation manifold in place of the hose fitting 36, thus avoiding the need for a hose fitting 36 and knurled nut 42. The air hose may also be connected to a tire valve stem 32 by any suitable connection means, such as threaded connector 43. In some embodiments, the threaded connector may include a post 45 that mechanically engages and opens the tire valve 44 when the hose is connected to the tire valve stem, thus allowing two-way fluid flow through the tire valve. The inflation manifold may include a threaded post 46 to allow the inflation manifold to be threadably mounted to the hubcap. In other embodiments, the inflation manifold may comprise an aperture threaded to receive a bolt so as to permit mounting to a wheel end by use of a bracket (not shown).

Figure 5:
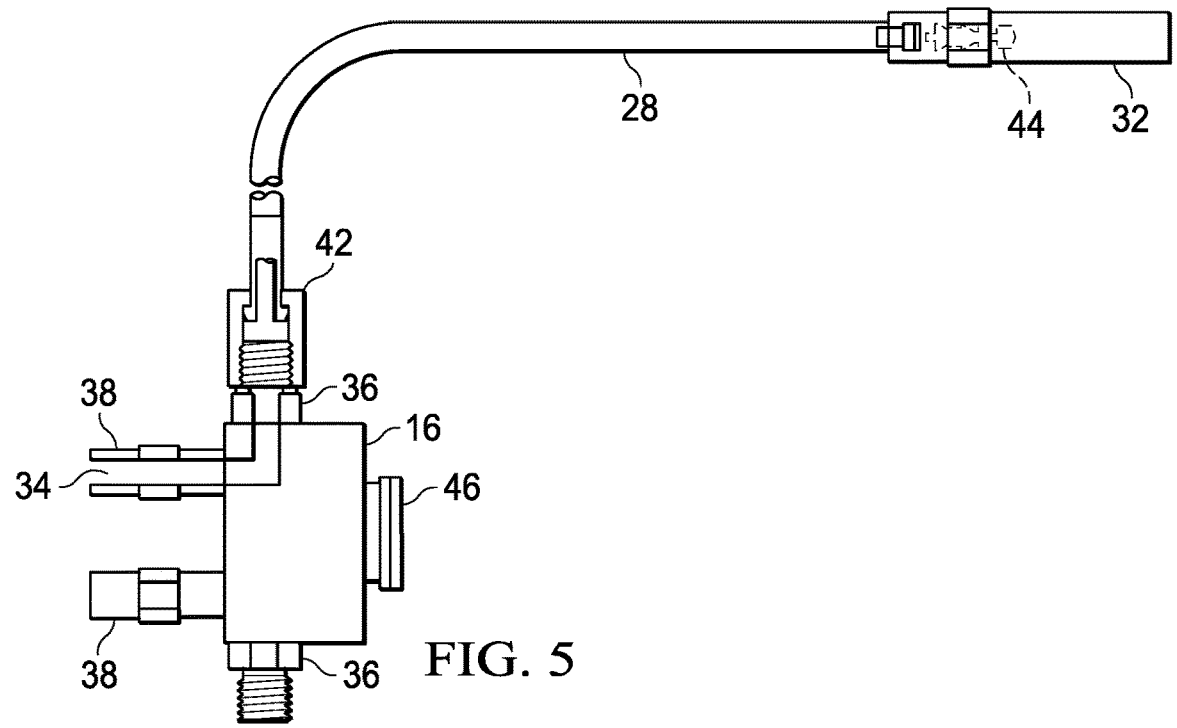
FIG. 5 illustrates an embodiment of an inflation manifold having no valves.

As may be seen in the embodiment of FIG. 5, the inflation fitting need not contain a valve. A cap (not shown), such as a Haltec DS-1 Flow-Through cap, may be used to protect the inflation fitting from ingress of debris and dust, and prevent unwanted deflation of the tire. In other embodiments, the air hose may not include a post for maintaining the tire valve 44 in an open position, thus allowing the tire valve 44 to open under pressure of fluid introduced into the inflation manifold 16 through the fluid channel 34. In such embodiments, a flow-through cap may be used, or non-flow-through cap may be used and removed for inflating the tire.

Figure 6:
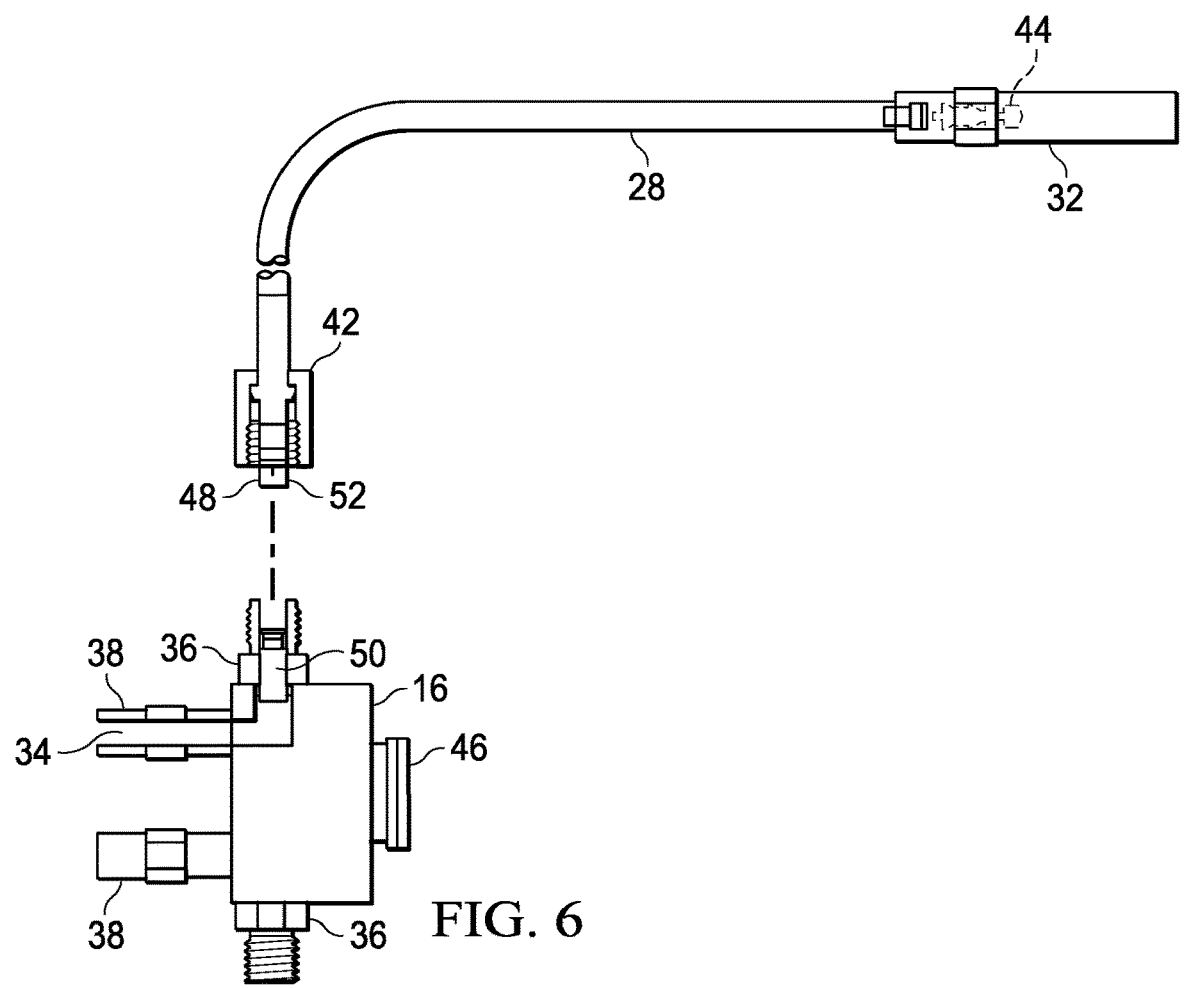
FIG. 6 illustrates an embodiment of an inflation manifold having a hose fitting valve arrangement.

As may be seen in the embodiment of FIG. 6, a different valve arrangement may be used at the inflation manifold if a typical ATIS air hose is used. A typical ATIS air hose may include a one-way valve disposed at the end to be mounted to the inflation manifold. In such embodiments, a one-way check valve 48, such as a Schrader® valve, may be mounted in the inflation fitting to permit air to flow from the inflation manifold fluid channel into the hose. A one-way check valve 50 may also be disposed in the hose fitting. A post 52 at the end of the hose may depress and thus open the one-way check valve 50 when the hose is connected to the hose fitting. Thus, when the air hose 28 is connected to the tire stem, the normally-closed one-way check valve 50 may be held open such that fluid may freely flow back and forth through the one-way check valve 50 between the air hose and the interior of the tire. In such embodiments, a flow-through cap may be removably mounted to the inflation fitting 38 to seal the fluid channel 34.

Figure 7:
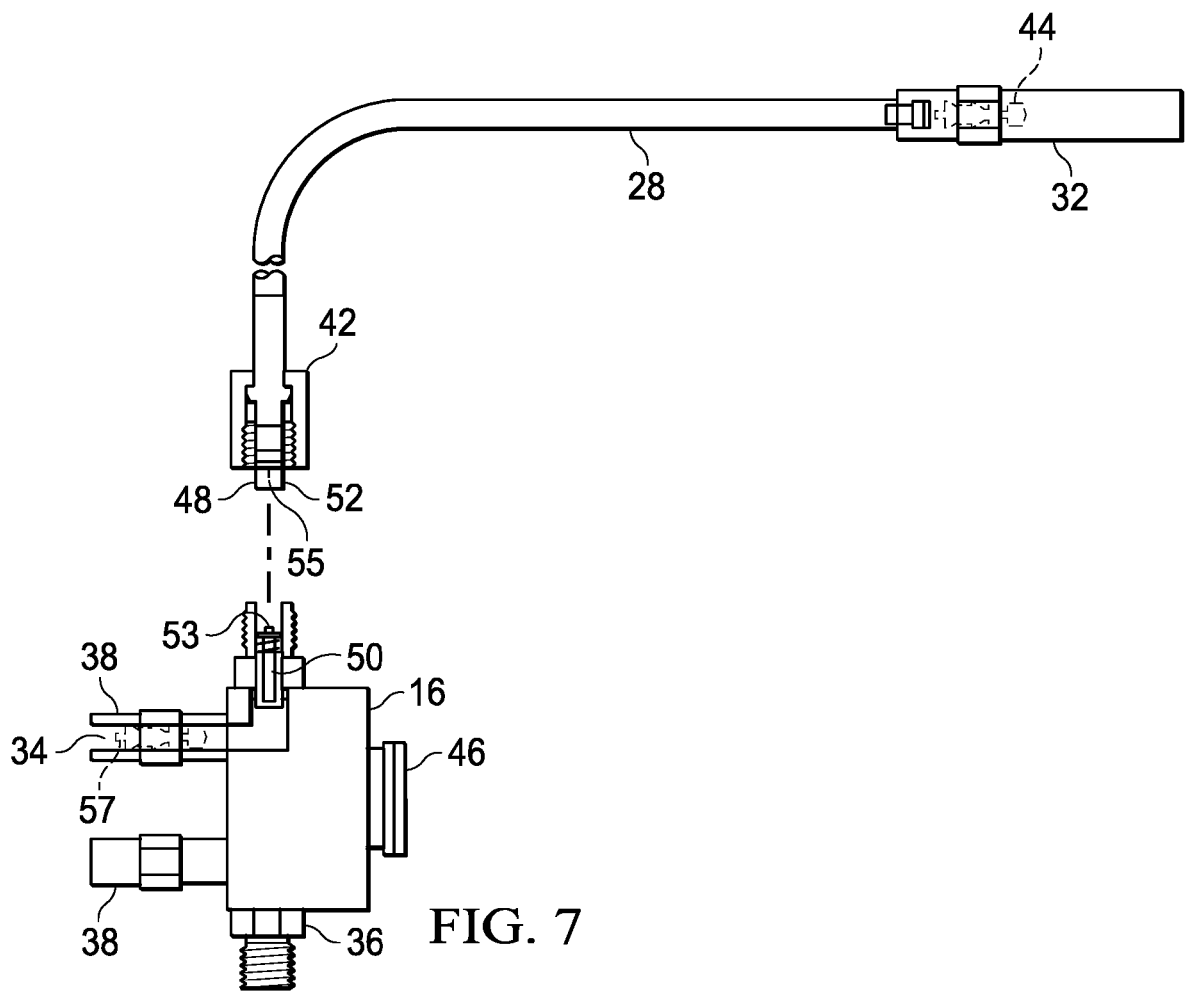
FIG. 7 illustrates an embodiment of an inflation manifold having different valve arrangement.

As may be seen in the embodiment of FIG. 7, a yet different valve arrangement may be used at the inflation manifold. In such embodiment, a one-way check valve 48, such as a Schrader® valve, may be mounted in the hose fitting to permit air to flow from the inflation manifold fluid channel into the hose. A one-way check valve 50 may also be disposed in a post 52 at the end of the hose. The hose post 52 may depress and thus open the one-way check valve 50 when the hose is connected to the hose fitting. A second post 53 may be provided on the one-way check valve 50. The second post may mechanically actuate the one-way check valve 50 by depressing the poppet 55 of the one-way check valve 50. A second one-way check valve 57 may be disposed in the fluid channel 34. Thus, when the air hose 28 is connected to the manifold and to the tire stem, the normally-closed one-way check valves 44, 48 and 50 are held open such that fluid may freely flow between the second one-way valve 57 and the interior of the tire.

Figure 8:
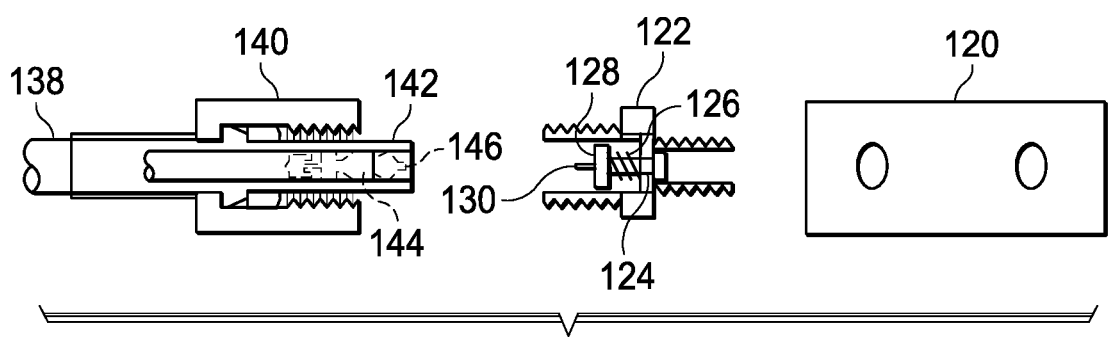
FIG. 8 provides further detail of the valve arrangement of FIG. 6A.

The valve-and-post arrangement is shown in more detail in FIG. 8. An inflation manifold 120 may be provided with a hose fitting 122. The hose fitting may comprise a normally-closed one-way valve 124 that may be opened against spring 126 pressure. Pressurized fluid flowing into the hose fitting toward the inflation manifold may open the one-way valve 124. Pressurized fluid flowing into the hose fitting from the inflation manifold may be blocked by the one-way valve 124 in its normally-closed state. The poppet 128 may be provided with a valve post 130. An air hose 138 may be provided with a connector 140 mounted to a hose post 142. A normally-closed one-way valve 144 may be disposed in the hose post 142. Pressurized fluid flowing into the hose post from the end of the hose (e.g., from the inflation manifold if attached thereto) may open the one-way valve 144. Pressurized fluid flowing from the air hose to atmosphere (such as flowing out of the hose when uncoupled from the inflation manifold) may be blocked by the one-way valve 144 in its normally-closed state. When the hose connector is coupled to the hose fitting 122, the hose post 142 may co-act with the poppet of one-way valve 124 to open the one-way valve 124 against the spring pressure, and the valve post 130 may co-act with the poppet of one-way valve 144 to open the one-way valve 144 against spring pressure. Such coupling may serve to open both one-way valves 144 and 124, thus allowing free flow of fluid back and forth through the one-way valves 144 and 124.

Figure 9:
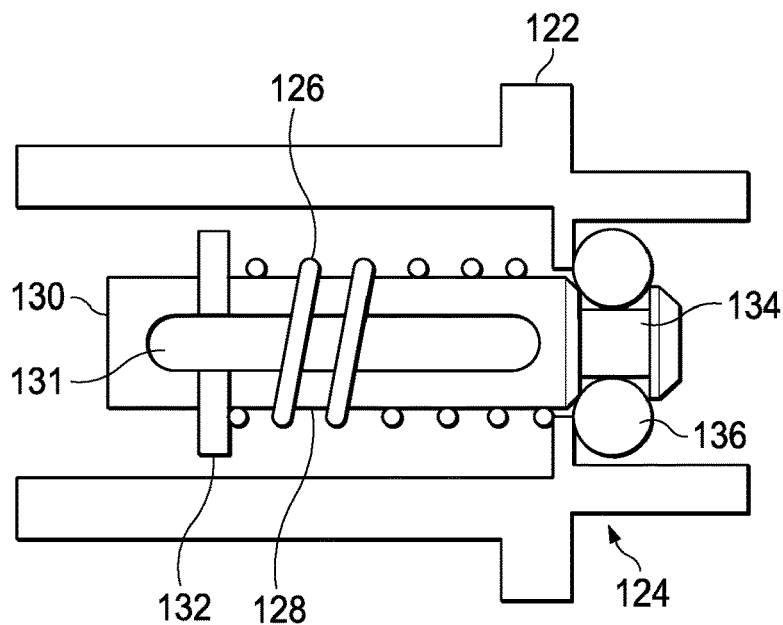
FIG. 9 illustrates the valve poppet of FIG. 6D disposed in a hose fitting.

FIG. 9 provides further detail of an embodiment of the poppet 128. The poppet may be provided with a post 130 as described above. A fluid groove 131 may be provided to allow pressurized fluid to flow along the poppet. The fluid groove 131 may extend along the shaft of the post 130 through the poppet flange 132. The fluid groove 131 may comprise a shallow "trough", or may comprise a slot through the post 130. The poppet may include a circumferential seal groove 134 in which an annular seal 136, such as an o-ring, may be disposed. The embodiment of FIG. 9 illustrates the poppet 128 disposed in a hose fitting 122 with an annular seal 136 so as to form the one-way valve 124. When a hose connector (not shown) is coupled to the hose fitting 122, the hose post (not shown) may co-act with the poppet 128 of one-way valve 124 to open the one-way valve 124 against the spring 126 pressure, and the valve post 130 may co-act with the poppet of the valve of the hose to open the one-way valve 14 against spring pressure. Such coupling may serve to open both the hose valve and the one-way valve 124, thus allowing free flow of fluid back and forth through the valves as described above, including through the fluid groove 131.

Thus, for such embodiments, the fluid inflating pressure need only overcome the bias of the one-way valve 57. Such a valve arrangement allows for the air hose 28 to be disconnected from the tire valve stem or the inflation manifold without releasing fluid from the tire. Disconnecting the air hose from the tire valve stem allows the one-way check valve 44 to close. Disconnecting the air hose from the hose fitting 36 may allow both of the one-way check valves 48 and 50 to close, thus sealing both the air hose and the inflation manifold.

Figure 10:
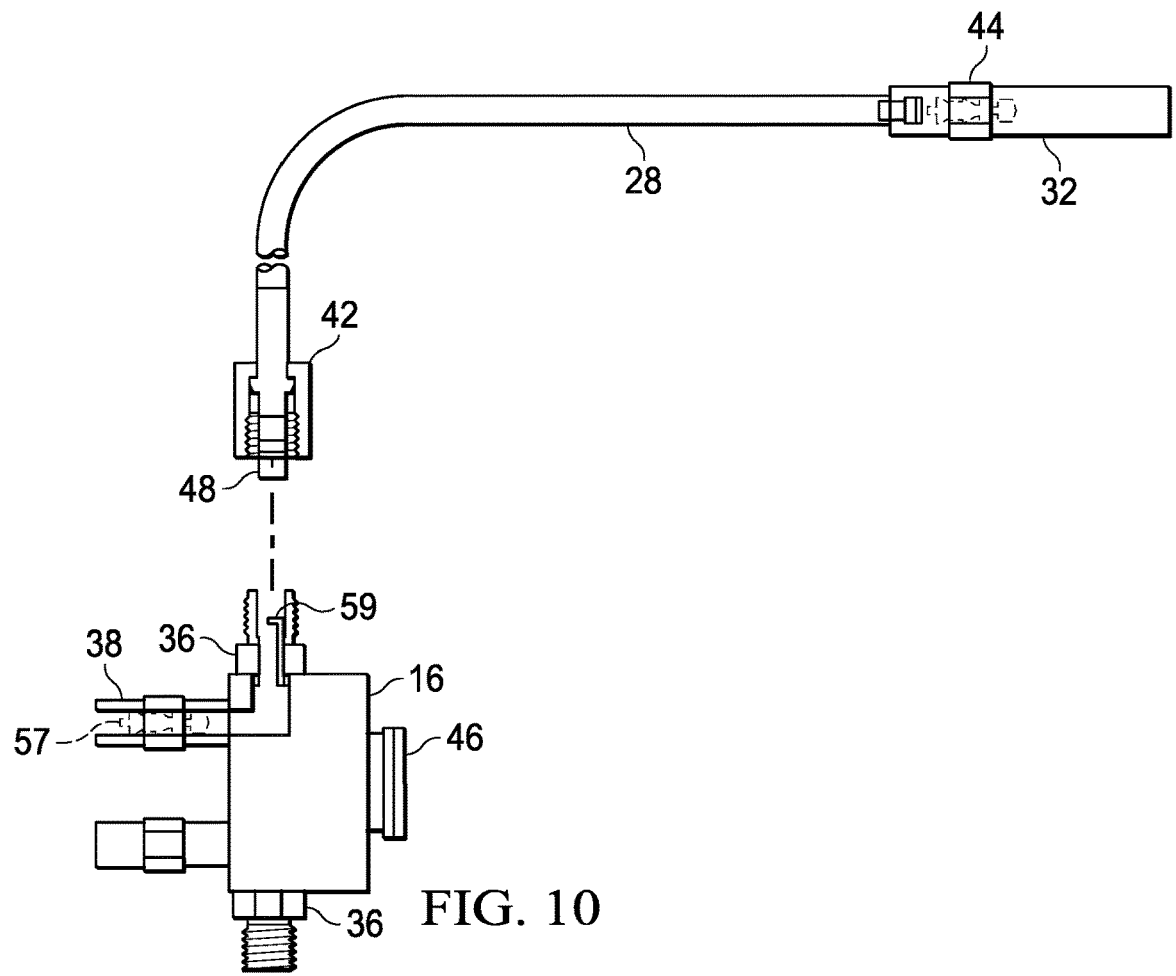
FIG. 10 illustrates an embodiment of an inflation manifold having another valve arrangement.
Figure 11D:
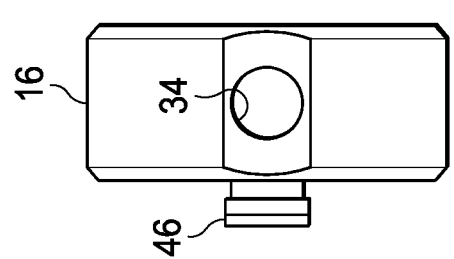
FIGS. 11A, 11B, 11C and 11D illustrate various views of an inflation manifold embodiment.
Figure 11C:
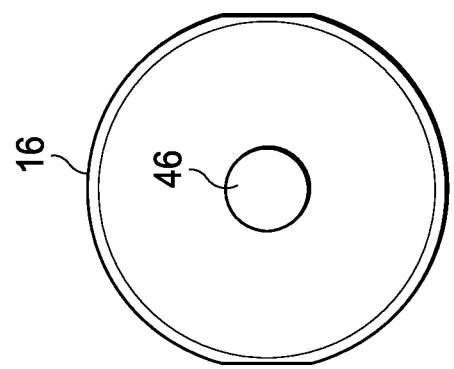
Figure 11B:
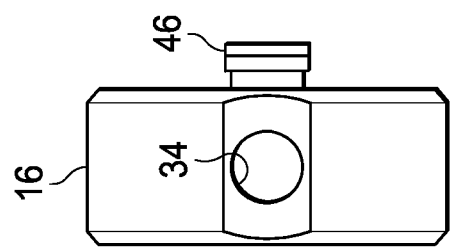
Figure 11A:
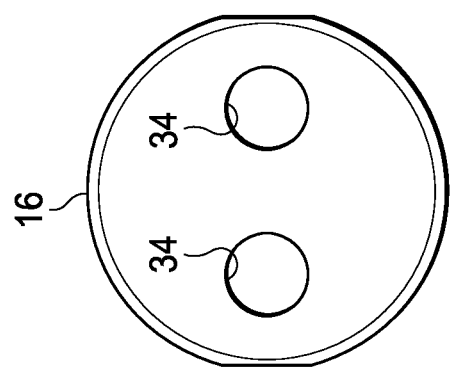

In other embodiments, such as may be seen in FIG. 10, the one-way check valve 50 and post 53 may be replaced with a fixed post 59 that opens the one-way check valve 48 when the hose connector is connected to the hose fitting, much like the post-and-valve arrangement for one-way check valve 44. Thus, when the air hose is disconnected from the inflation manifold, the one-way check valve 48 may close, thus preventing pressurized fluid from escaping the tire.

An inflation manifold may be configured in a variety of ways. For example, as may be seen in FIGS. 11A, 11B, 11C and 11D, a fluid channel 150 may extend from a radial or side face of the manifold to a front or top face of the manifold. Or, as may be seen in the embodiment of FIGS. 12A, 12B, 12C and 12D each opening of the fluid channel 150 is disposed on a radial face of the inflation manifold so that no fittings protrude from the front face 60 of the inflation manifold. Thus, a hose fitting (not shown) may be disposed at the outlet 62 of each fluid channel, and an inflation fitting (not shown) may be disposed at the inlet 64 of each fluid channel. The inflation manifolds may include a threaded post on its bottom or back face (not shown) to allow the inflation manifold to be threadably mounted to the hubcap. In other embodiments, the inflation manifold may be adapted to fasten to a bracket mounted to the wheel end. The hose fittings and inflation fittings may be provided with one-way check valves as discussed above, depending on configuration.

Figure 12D:
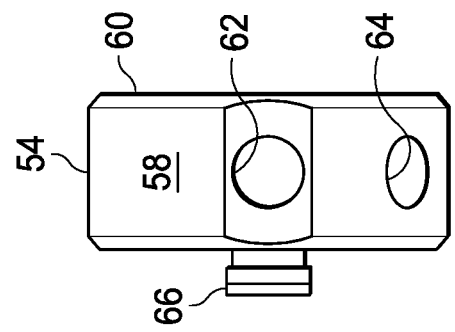
FIGS. 12A, 12B, 12C and 12D illustrate various views of another embodiment of an inflation manifold.
Figure 12C:
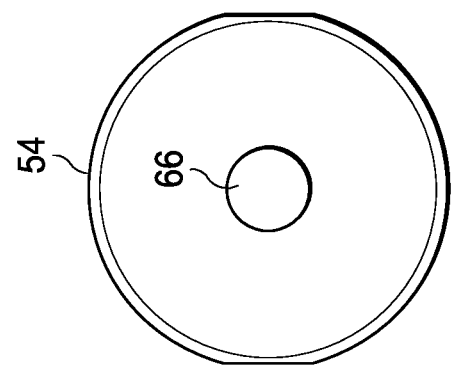
Figure 12B:
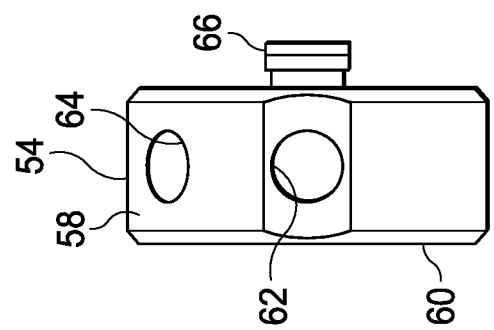
Figure 12A:
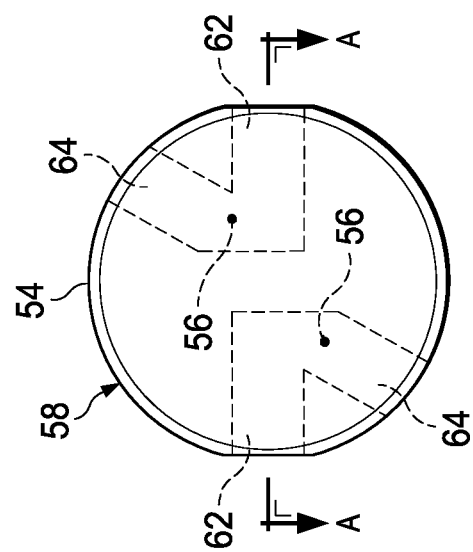
Figure 13B:
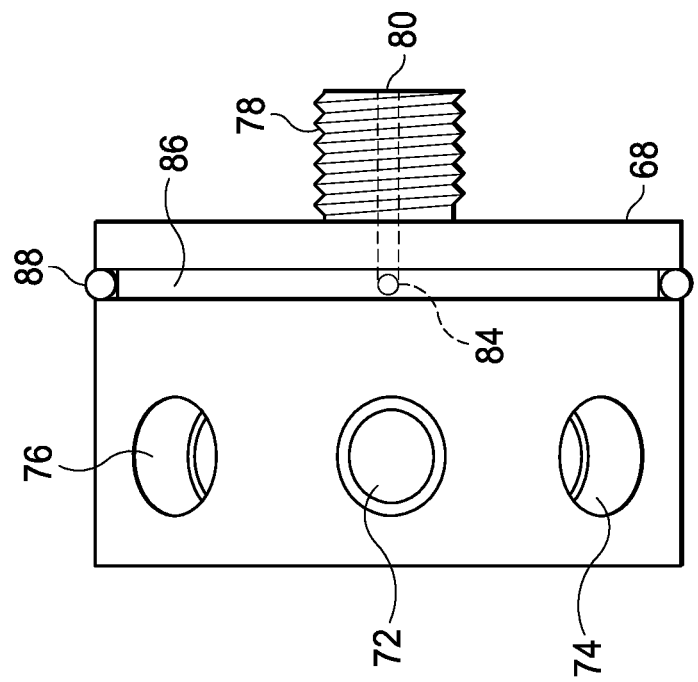
FIGS. 13A and 13B illustrate various views of another embodiment of an inflation manifold.

FIGS. 12A and 13B illustrate different views of yet another embodiment of an inflation manifold 68. The inflation manifold 68 may include two fluid channels 70, each having an inlet 72, an outlet 74 and an auxiliary port 76. Thus, a hose fitting (not shown) may be disposed at the outlet 74 of each fluid channel, and an inflation fitting (not shown) may be disposed at the inlet 72 of each fluid channel. A Tire Pressure Monitoring System (TPMS) sensor (not shown), such as a sensor having a readout display as discussed below, may be disposed in the auxiliary port 76. In other embodiments, a pressure relief valve may be disposed in the auxiliary port 76. As may be seen in FIGS. 13A and 13B, the inflation manifold may include a threaded post 78 to allow the inflation manifold to be threadably mounted to the hubcap. In other embodiments, the inflation manifold may be adapted to fasten to a bracket mounted to the wheel end.

Figure 13A:
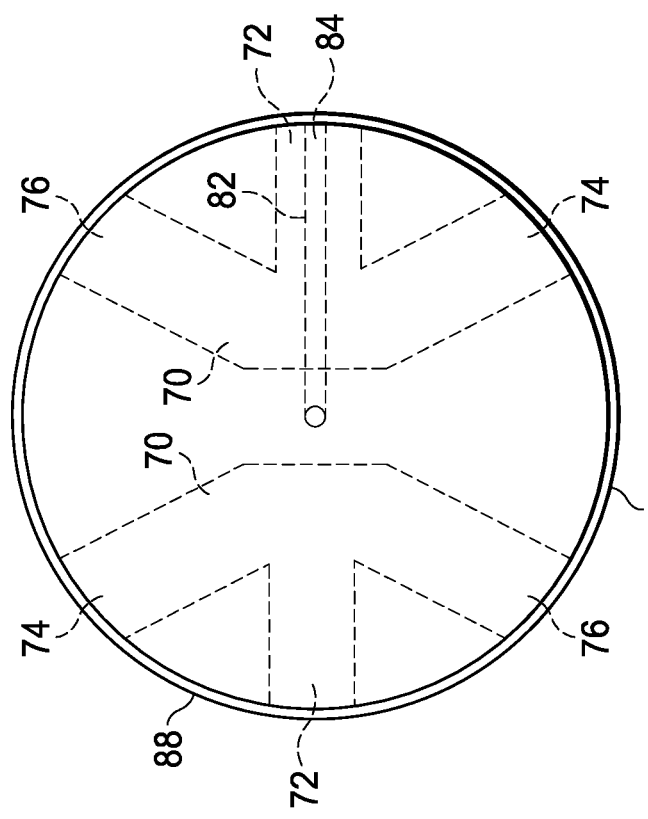
Figure 14:
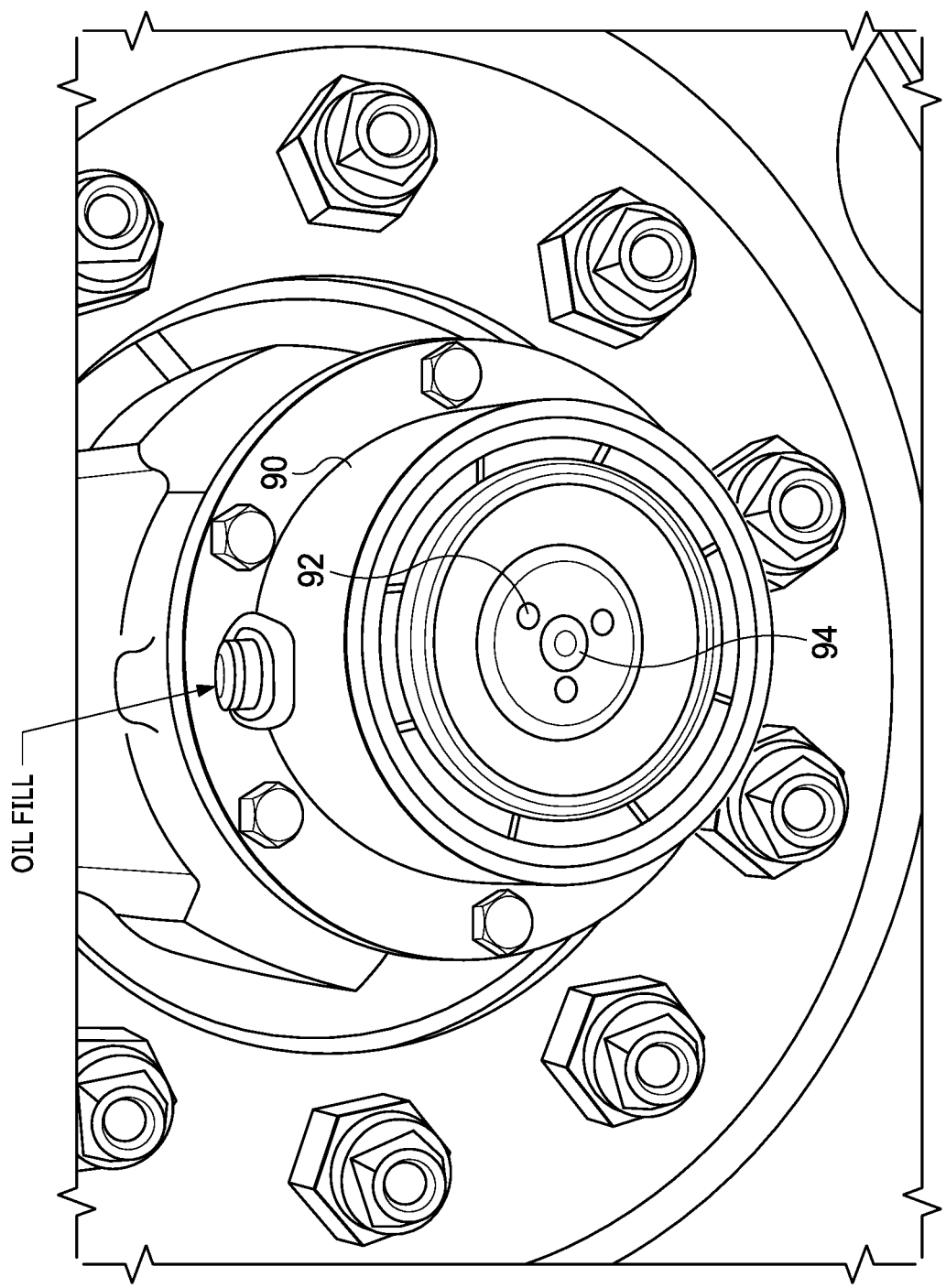
FIG. 14 illustrates a hubcap having vents.

As may be seen in the embodiment of FIG. 14, a hubcap 90 suitable for use with an automatic tire inflation system (ATIS) (not shown) may contain one or more vent holes 92. The vent holes may be located about the opening 94 in which the rotary air connection (not shown) of an ATIS may be mounted. The inflation manifold 68 may be configured to accommodate hubcap venting, as shown in FIGS. 13A and 13B. As may be seen in FIGS. 13A and 13B, a vent channel 80 may extend along the central axis of the threaded post 78. A vent cross-channel 82 may extend radially from the vent channel 80 to a side or radial face of the inflation manifold. The outlet 84 of the vent cross-channel 82 may be located in a groove 86 cut in the side face of the inflation manifold. If the inflation manifold 68 is mounted to the hubcap so as to cover the vent holes (shown in FIG. 14), then hubcap pressure may be released through the vent channel. As air pressure builds in the hubcap 90, pressurized air may flow into the vent channel 80 and out to atmosphere through the outlet 84 of the vent cross-channel 82. To prevent dust and debris from entering the outlet 84, a gland 88 may be disposed in the groove to cover the outlet 84. If the inflation manifold is round, as seen in FIGS. 13A and 13B, then the gland may comprise an o-ring. The gland may be sufficiently elastic to move away from the outlet 84 under pressure of air from the hubcap.

Figure 15A:
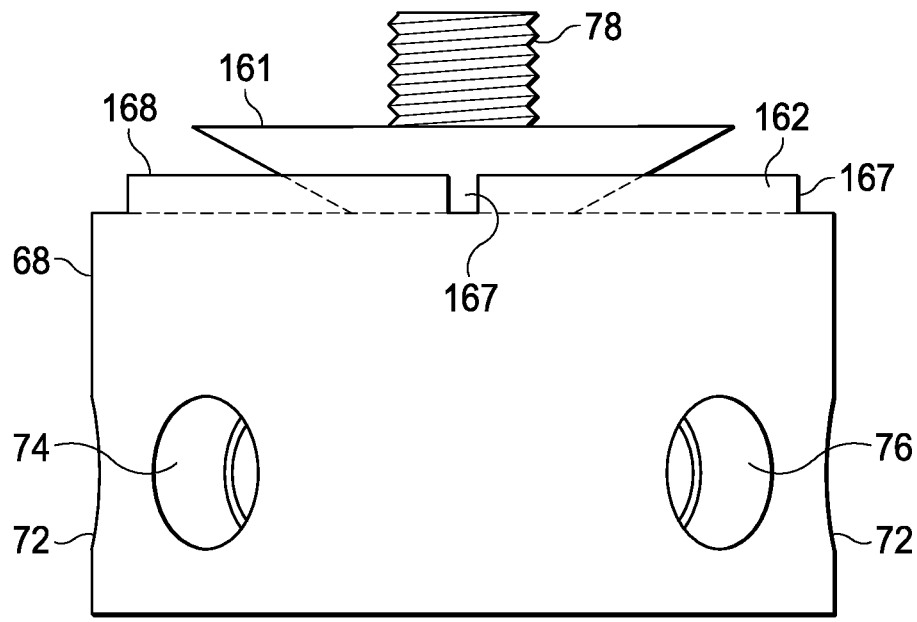
FIG. 15A illustrates another embodiment of an inflation manifold.
Figure 15B:
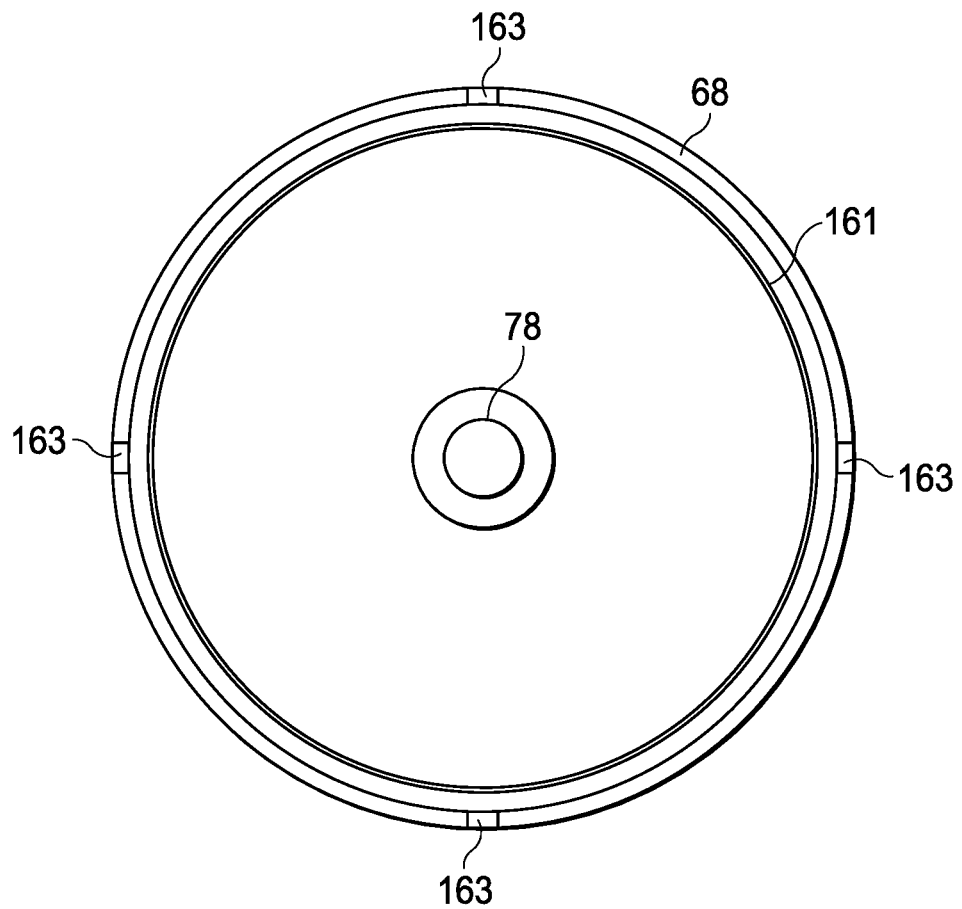
FIG. 15B illustrates a bottom view of the embodiment of FIG. 15A.

In other embodiments, an inflation manifold with no vent channel may be configured to allow hubcap pressure to escape when the inflation manifold is mounted to a hubcap of the type have vent holes (as in FIG. 14). As may be seen in FIGS. 15A and 15B, threaded post 78 may allow the inflation manifold 68 to be attached to the hubcap as in previous embodiments. For hubcaps that may have holes 163 for venting of the hubcap, an inflation manifold 68 may have a shroud 161 so as to provide a seal between the inflation manifold 68 and the hubcap. Such a shroud 161 may be disposed in a depression 162 formed in the lower face of the inflation manifold 68. In the event of overpressurization of the hubcap, pressure relief may be realized through the vent holes 163 and then by deformation of the shroud 161. The shroud 161 may allow over-pressurization from the vent holes 163 to then release by violating the seal between the lip of the shroud 161 and the face of the hubcap with which the shroud 161 may be in contact. The resulting high pressure developed inside the depression 162 in the body of the inflation manifold 68 may then be relieved through vent channels 167 in the lower rim 168 of the inflation manifold body 68.

Figure 16:
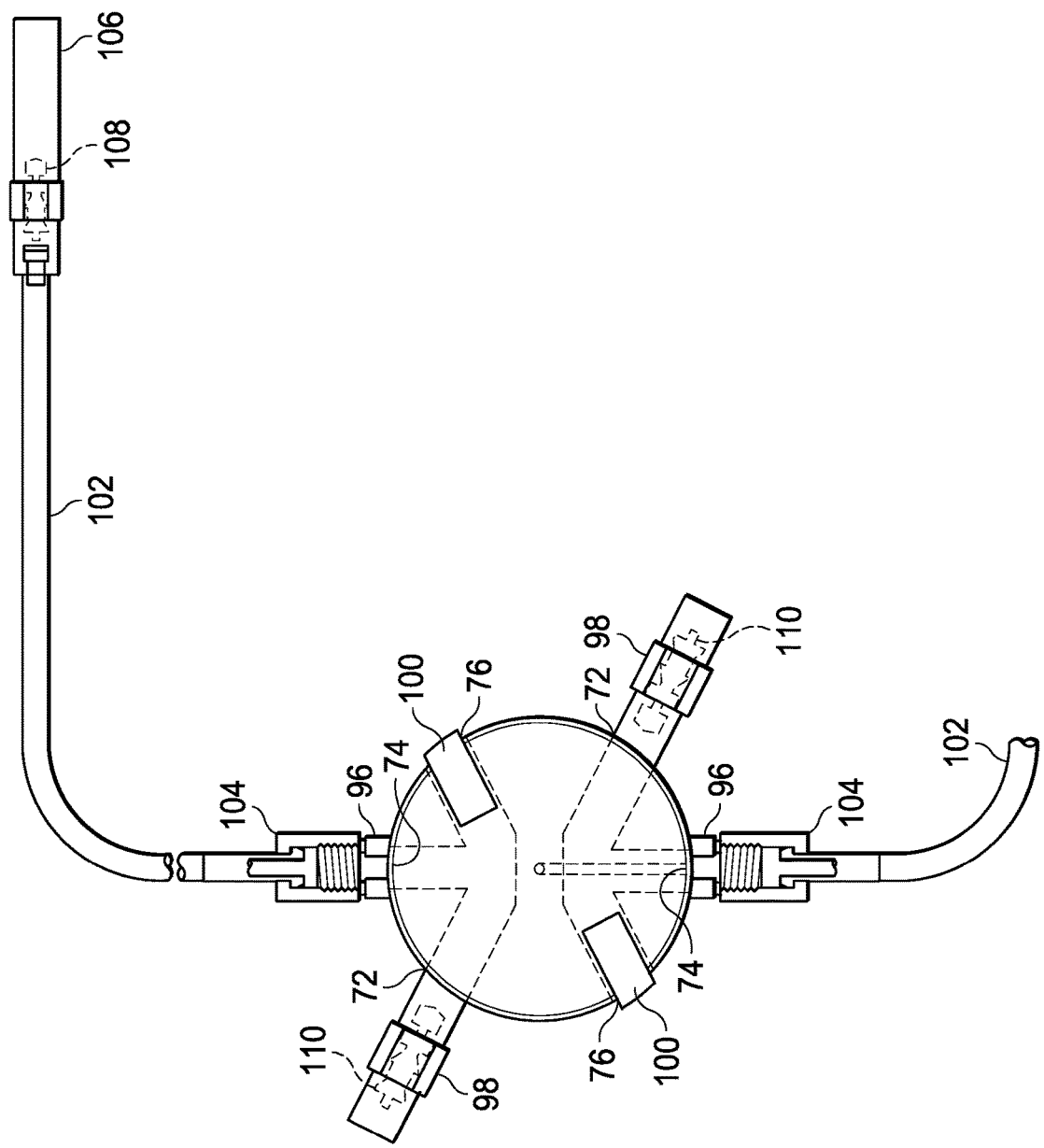
FIG. 16 illustrates an inflation manifold embodiment having inflation fittings, hose fittings and TPMS sensors mounted thereto.

FIG. 16 illustrates how various components may be mounted to an inflation manifold having three ports. A hose connector 104 may be coupled to a hose fitting 96 disposed at the outlet 74 of each fluid channel 70, and an inflation fitting 98 may be disposed at the inlet 72 of each fluid channel. The hose connector may be a knurled nut. In other embodiments, the hose may be coupled directly to the inflation manifold outlet 74 by a threaded fitting, such as a ⅛ NPT fitting. The hose may also be connected to a tire valve stem 106 having a conventional tire valve 108. A TPMS sensor 100 may be disposed in an auxiliary port 76. The TPMS sensor may comprise a visual display (not shown) as described in more detail herein. As noted above, in alternative embodiments, a pressure relief valve may be disposed in the auxiliary port 76. A one-way check valve 110, such as a Schrader® valve, may be mounted in the inflation fitting to permit air to flow from an air pressure source through the inflation fitting into the fluid channel. A tire pressure gauge may also be coupled to the inflation fitting so as to open the valve, thus allowing the tire pressure to be checked. Of course, various other valve arrangements may be used, such as may be seen in the foregoing embodiment.

Figure 17:
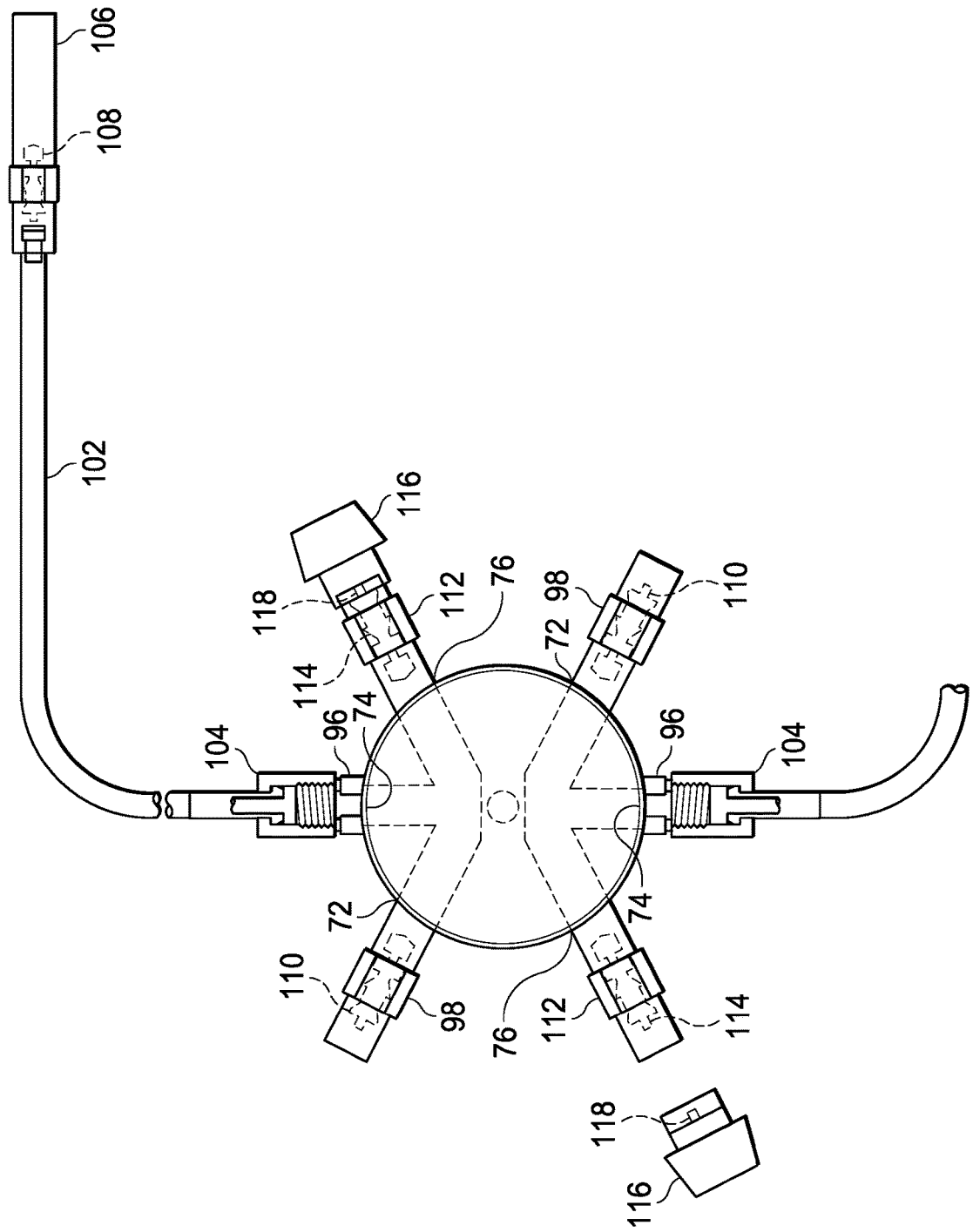
FIG. 17 illustrates an inflation manifold embodiment having inflation fittings, hose fittings and TPMS sensors mounted thereto in a different manner.

FIG. 17 illustrates another embodiment of how various components may be mounted to an inflation manifold having three ports. In the embodiment of FIG. 17, the hose 102 and hose fitting 96 may be provided with no valves as in FIG. 4, or any of the valve arrangements of FIG. 7, 8 or 9, or any permutation thereof. A TPMS fitting 112 may be provided in each auxiliary port 76. A TPMS sensor 116 may be removably coupled to the TPMS fitting. In some embodiments, the TPMS fitting may be the same as the inflation fitting 98 and carry a normally-closed one-way valve 114. Thus, if the TPMS sensor is removed from the TPMS fitting, then fluid will not escape from the tire. When the TPMS sensor is coupled to the TPMS fitting, a TPMS post 118 may mechanically open the valve so that fluid may freely flow between the TPMS sensor and tire. In other embodiments, the TPMS fitting may carry no valve and simply provide a channel that allows free flow of fluid between the TPMS sensor 116 and the fluid channel 70 with which it is in fluid communication.

Figure 18:
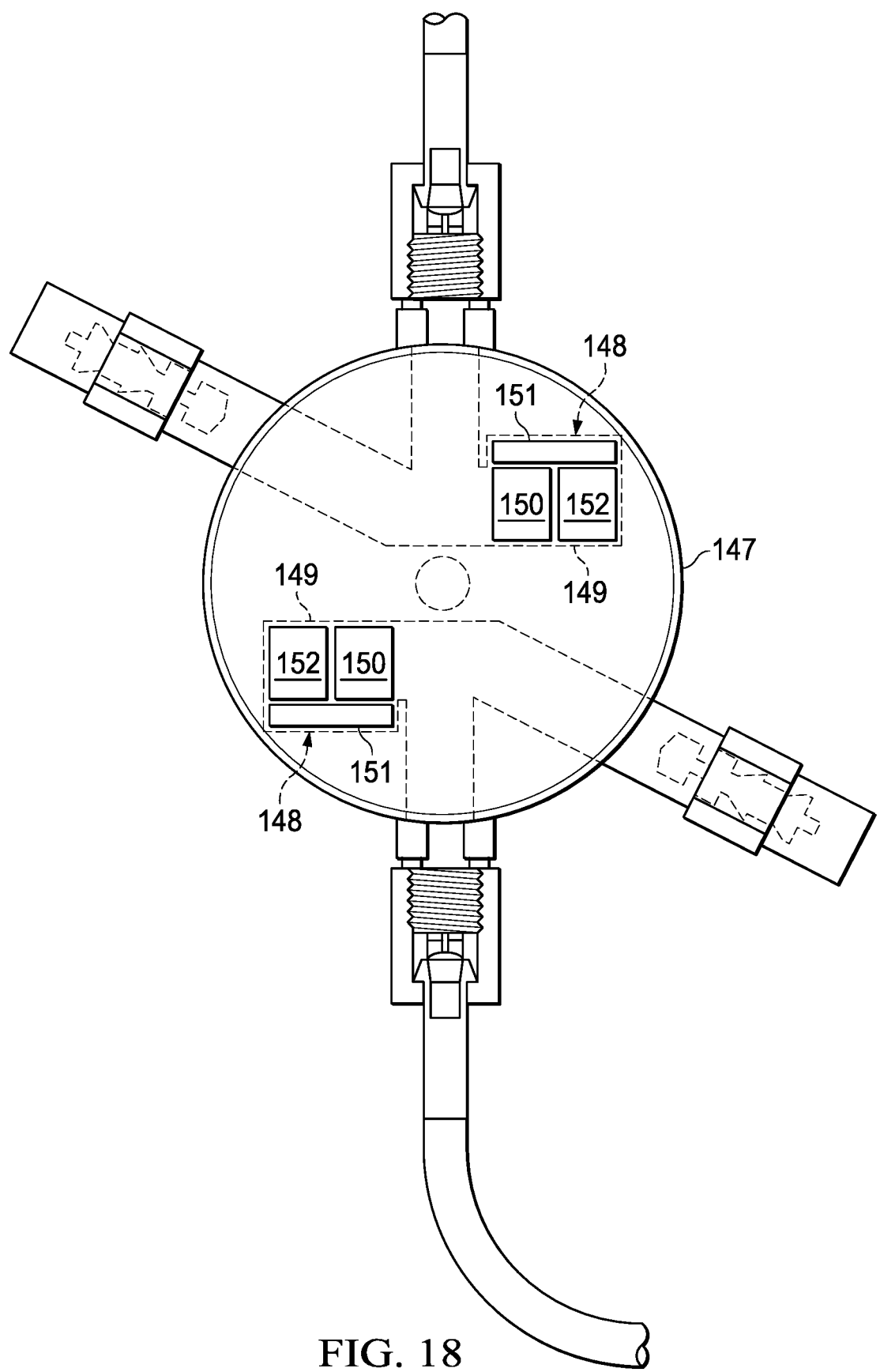
FIG. 18 illustrates an inflation manifold having TPMS sensors disposed therein.

In further embodiments, such as may be seen in FIG. 18, an inflation manifold 147 may comprise TPMS sensors 148 embedded or removably installed in a compartment 149 therein. Each TPMS sensor may correspond to a vehicle tire. The compartment may be configured to receive a TPMS sensor having a transducer 150, a power source 151 such as a battery, and a transceiver 152 to allow communication as part of a TPMS system. The compartment may be configured to allow replacement of the battery, such as by use of a hinged lid, or screw-in plug. In other embodiments, a power source may comprise a solar power chip dispose on the inflation manifold. The TPMS sensor may be permanently or removably disposed in the compartment. The inflation manifold may further comprise a visual display (not shown) coupled to one or both of the TPMS sensors for indicating tire pressure and/or location. The visual display may be electronic.

In other embodiments, a TPMS module (not shown) may be mounted to an outer or top face of the inflation manifold, and may be in fluid communication with one or more of the fluid channels therein so as to sense pressure in one or more of the vehicle tires to which the inflation manifold is in fluid communication. The TPMS module may comprise a small electronics package having typical TMPS sensor components, and may be shaped so as to conform to the shape of the inflation manifold. The TPMS module may comprise an electronic display for displaying tire information, such as tire pressure and location. The TPMS module may further comprise a solar power source. In some embodiments, the TPMS module may be configured to sense other wheel-end phenomena, such as count tire rotations, sense ambient environmental conditions, detect moisture, detect wheel speed, detect vehicle speed and motion, detect vehicle location, and other vehicle data. Wheel-end data may be communicated via TPMS communication or by any other suitable wired or wireless communication mode to a monitor in the vehicle cab, or to a driver mobile device, or to a remote location (such as a fleet maintenance facility or fleet dispatcher).

By mounting or disposing a TPMS sensor in an inflation manifold, the sensor may stay with the truck or trailer, and may remain further associated with a particular tire or tire position, rather than be removed when the tire is changed. In the prior art, TPMS sensors are disposed on the tire stem or in the tire cavity or to each wheel. Thus, when a tire is changed, the TPMS sensor may be lost, damage or simply not re-installed. And, for TPMS sensors that identify a particular wheel or location on the truck or trailer, failure to replace the TPMS sensor or installing the TPMS sensor on the wrong tire may result in erroneous data being transmitted to the TPMS system. Installing a TPMS sensor in or about the inflation manifold may avoid such issues.

Figure 19:
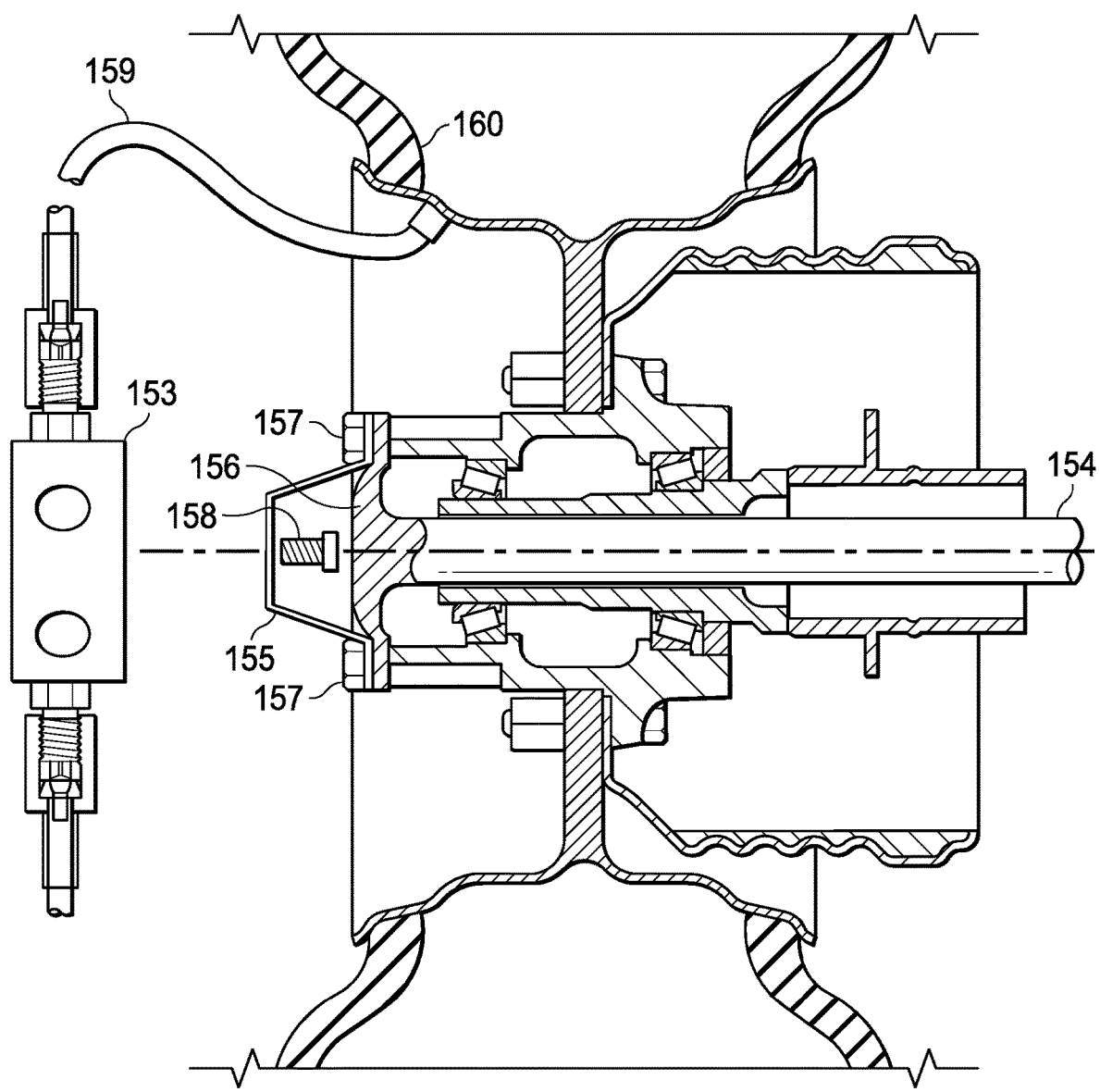
FIG. 19 illustrates an inflation manifold configured for mounting to a drive axle.

As may be seen in FIG. 19, an inflation manifold 153 may be readily mounted to a drive axle 154. For example, a bracket 155 may be mounted to a drive axle flange 156, such as on hub lugs 157. The inflation manifold may be mounted to the bracket by any suitable means, such as by bolt 158. An air hose 159 may permit sealed fluid communication between the inflation manifold and the tire 160, as described in more detail above. In other embodiments, the inflation manifold may be welded to the drive axle flange or hub or wheel, or bolted or screwed, or glued, or removably mounted using any suitable fastener, such as hook-and-loop fastener.

An inflation manifold 16 may be also provided in dummy form as a hose support block 165. In such an embodiment, the block lacks fluid channels, and may simply be used to secure the ends of air hoses (such as ATIS air hoses) when not in use. Such air hoses provide easier tire inflation or tire pressure check. Air hoses with auxiliary ports or pressure relief valves may be used. A TPMS sensor may be disposed on an air hose with an auxiliary port, thus advantageously moving the TPMS sensor away from the tire as discussed above.

Thus, for a vehicle 2 that does not have an ATIS, the vehicle may be provided with a hose support block 165. Typically, for vehicles that have an ATIS installed, a rotary union may be used in place of the hose support block 165 to connect the one or more tires at each end of an axle (whether trailer, drive or steer) to a source of pressurized air to maintain the tires at a desired air pressure. The ATIS rotary union may connect to the valve stems of each tire using air hoses 14 in fluid communication with each tire 12 for communicating air from the air pressure source to and from the tires 12.

For vehicle having TPMS sensors for each tire but no ATIS, however, ATIS-ready air hoses and a hose support block 165 may be used to move the TPMS sensors toward a more central location on the wheel end.

Figure 20:
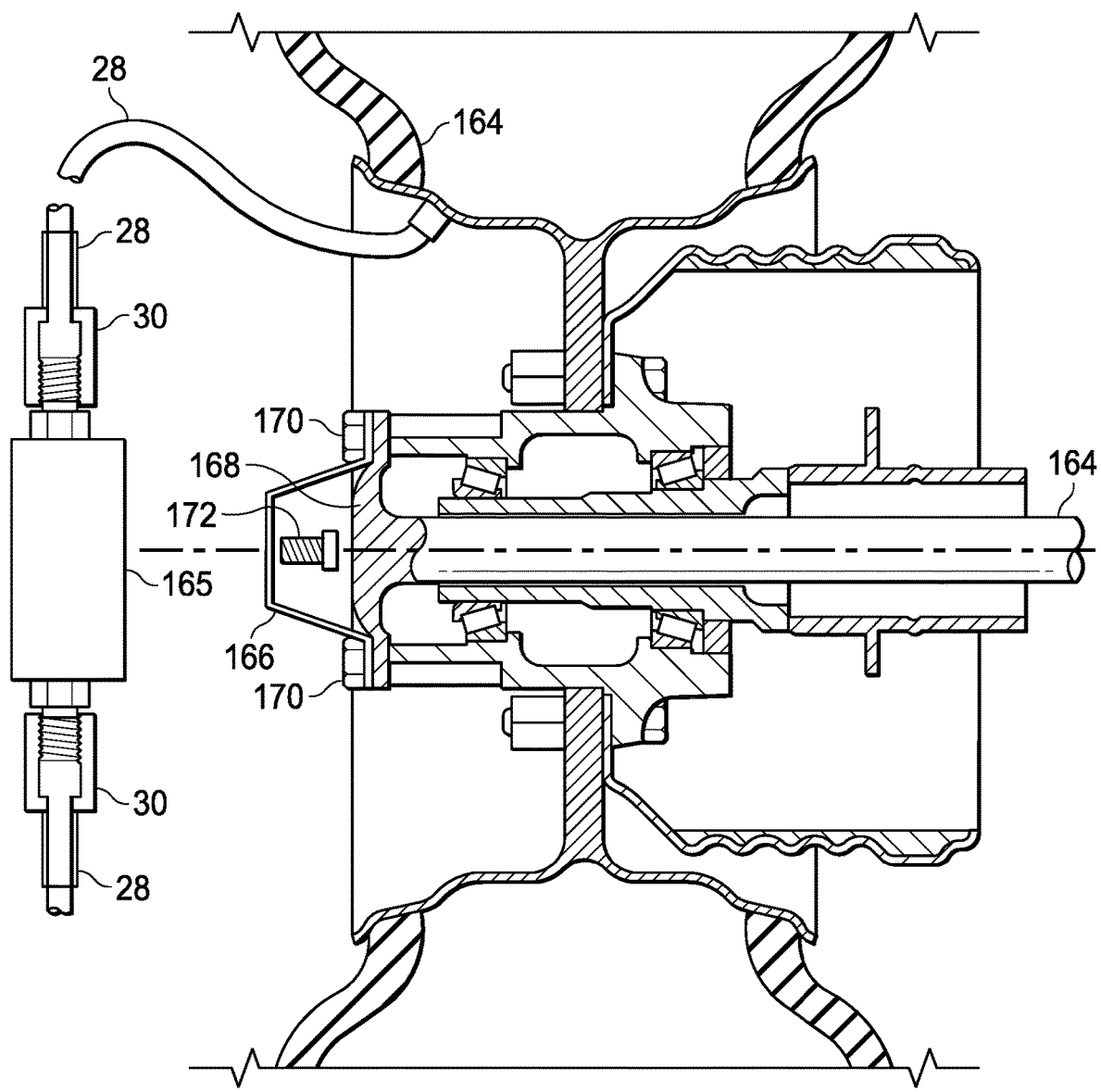
FIG. 20 illustrates mounting of a hose support block to a drive axle.

As may be seen in FIG. 20, a hose support block 165 may be readily mounted to a drive axle 164. For example, a bracket 166 may be mounted to a drive axle flange 164, such as on hub lugs 170. The hose support block may be mounted to the bracket by any suitable means, such as by bolt 172. An air hose 28 may permit sealed fluid communication between the hose support block and the tire 174. In other embodiments, the hose support block may be welded to the drive axle flange or hub or wheel, or bolted or screwed, or glued, or removably mounted using any suitable fastener, such as hook-and-loop fastener.

Figure 21:
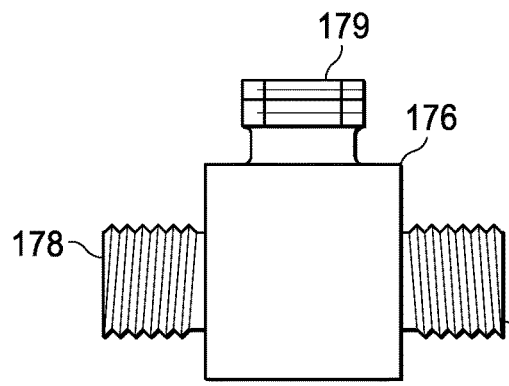
FIG. 21 illustrates an embodiment of a hose support block.
Figure 22:
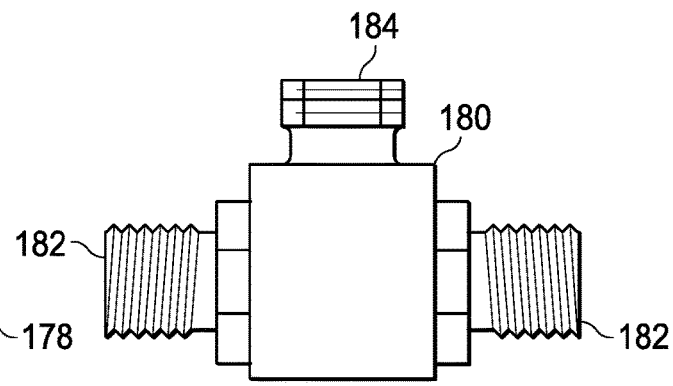
FIG. 22 illustrates another embodiment of a hose support block.

The hose support block, such as those depicted in FIGS. 21 and 22, may comprise any suitable body configured for connection to an air hose. In some embodiments, a machined or cast block 176 may be used, as in FIG. 21. The block may have threaded posts 178 configured for coupling with an ATIS air hose. In some embodiments, the hose support block may be mounted to the hubcap in the same manner that a rotary air connection of an automatic tire inflation system might be mounted. A hubcap post 179 may be provided for coupling the block with an ATIS-ready hubcap. The block 176 may have no fluid channels provided therein. In other embodiments, the block 176 may comprise a single fluid channel (not shown) running through the threaded posts 178. By using such a fluid channel, pressurized fluid may flow between the tires.

In other embodiments, a rotary union body, such as the air connection disclosed in Applicant's U.S. Pat. No. 5,769,979, may be used without any rotary sealing interface parts, such as annular seals or face seals, but with ATIS hose fittings, such as in FIG. 22. The body 180 may have ATIS hose fittings 182 coupled thereto. A hubcap post 184 may be provided for coupling the block with an ATIS-ready hubcap.

In other embodiments, the post 184 may be sealed to prevent fluid flow therethrough, thus leaving a single fluid channel (not shown) extending between the fittings 182. By using such a fluid channel in connection with fluid hosing having the valve arrangements of the hose 220 of FIG. 24 and the valve 228 of fitting 226 arrangement of FIGS. 18, pressurized fluid may flow through the block 180, thus allowing fluid pressure to equalize between pneumatic tires (not shown) sealingly coupled to the fittings 182.

In some embodiments, an ATIS air hose adapted for use with a TPMS may be used. As may be seen in the embodiment of FIGS. 20 and 23, an air hose 186 may have at one end 188 a connector 190 adapted to removably couple to a tire valve stem 192. The end 188 may, in some embodiments, include a post 194 disposed so that when the connector is coupled to the stem, the post may mechanically actuate the tire valve 196 by depressing the poppet 198. By holding the normally-closed valve open, pressurized fluid may communicate freely from the tire 200 fluid cavity 202 with the TPMS sensor 204. The other end 206 of the air hose may have a fitting 207 connector 208 (such as a knurled nut) configured for removably coupling with a hose support block and a functioning rotary union. An auxiliary port 210 may be provided in the fitting. The TPMS may be removably coupled to the auxiliary port so as to allow the TPMS sensor to sense the fluid pressure in the tire through communication with the air hose.

In other embodiments, the auxiliary port 210 may have a one-way valve 212 disposed therein so that when the TPMS sensor 204 is removed, pressurized fluid may not escape from the tire. The TPMS sensor may be provided with a post 216 disposed so that when the TPMS sensor is coupled to the auxiliary port, the post may mechanically actuate the valve 212 by depressing the poppet 214. By holding the normally-closed valve 212 open, pressurized fluid may communicate freely from the tire 200 fluid cavity 202 with the TPMS sensor 204.

A hose support block 222 may have an ATIS-ready hose fitting 224 mounted thereto. A one-way check valve 218, such as a Schrader® valve, may be disposed in the hose fitting 207. Thus, when the air hose 186 is connected to the tire stem, the normally-closed one-way valve 198 may be held open; however, the valve 218 may prevent fluid from escaping from the air hose when the hose is disconnected from the hose support block. In some embodiments, the tire may be inflated by disconnecting the air hose from the hose support block and coupling the end of the hose to a pressurized fluid source.

In some embodiments, a one-way check valve 217 (such as a check valve 124 of FIGS. 8 and 9) may be optionally provided in the hose fitting to prevent air from flowing through the hose support block fluid channel into the hose. A post 220 at the end of the hose fitting may depress and thus open the valve 217 when the hose is connected to the hose fitting, thus allowing fluid to flow between fluid fittings. If there is no fluid channel between the fluid fittings, then the hose block itself will prevent deflation of the tire when the valves 217 and 218 are open. Thus, standard ATIS hoses and fittings may be used, even though the valve actuation serves no tire inflation purpose. However, use of such hoses and fittings can permit the wheel end to be more easily and cost-effectively retrofitted with an ATIS. If the hose fitting does not have a valve 217, then the hose fitting may simply be configured to accommodate the post. For hose support blocks machined as a solid block without fluid channels, apertures may be provided to accommodate a hose post that may be found in an ATIS hose.

Figure 23:
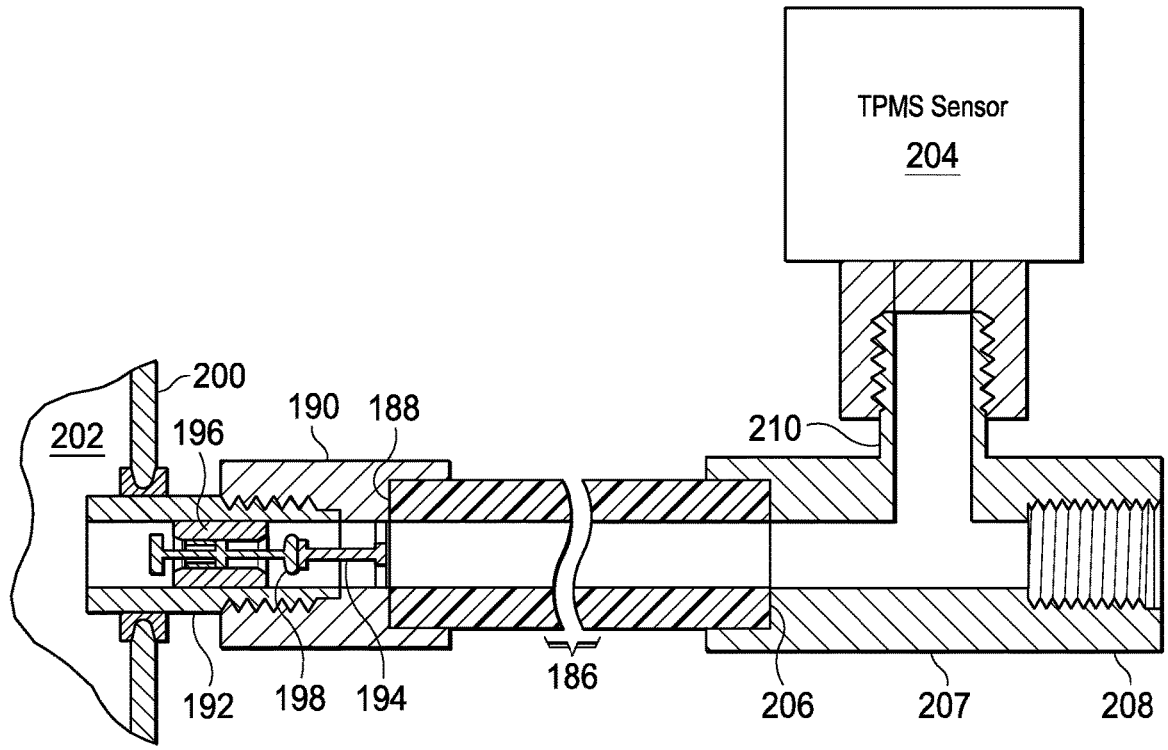
FIG. 23 illustrates an air hose with auxiliary port and having a TPMS sensor removably coupled thereto.

The embodiments of FIGS. 25 and 26 are like those of FIGS. 23 and 24, except that the TPMS sensor 226 is either non-removably integrated into the air hose, or is sealingly coupled in-line with the air hose so as to remove the need for an auxiliary port.

As shown in FIG. 27, if a TPMS sensor is not coupled to the auxiliary port, then the port may be covered by a cap (not shown), such as a Haltec DS-1 Flow-Through cap, which may protect the inflation fitting from ingress of debris and dust. The tire may be inflated by coupling the auxiliary port with a pressurized fluid source without need for disconnecting the hose from the hose support block.

Such a valve arrangement allows for the air hose to be disconnected from the tire valve stem or the hose block without releasing fluid from the tire. Disconnecting the air hose from the tire valve stem allows the one-way check valve in the valve stem to close. Disconnecting the air hose from the hose fitting on a hose block having a fluid channel may allow both of the one-way check valves in the hose post and the fitting to close, thus sealing both the air hose and the hose block.

In other embodiments, the one-way check valve and post may be replaced with a fixed post that opens the one-way check valve when the hose connector is connected to the hose fitting, much like the post-and-valve arrangement for one-way check valve 228 of FIGS. 8 and 9. Thus, when the air hose is disconnected from the inflation manifold, the one-way check valve 250 may close, thus preventing pressurized fluid from escaping the tire.

A hose support block may be configured to allow mounting to a hubcap, such as by including a threaded post that may be screwed into the hubcap. In other embodiments, the hose support block may be bolted or screwed to the hubcap, or glued, or removably mounted using any suitable fastener, such as hook-and-loop fastener. In yet other embodiments, the hose support block may be integrated into the hubcap, or configured to replace all or part of a hubcap sight glass, or be configured as a ring that may be disposed under the hubcap sight glass. In further embodiments, the hose support block may be mounted to any other part of the wheel-end, such as to the wheel or hub. In yet further embodiments, the hose support block may be mounted to a bracket attached to a wheel-end.

A hose support block may be made from any available ATIS rotary union, whether used intact or with rotary seal parts removed. Similarly, air hoses may be used from any suitable ATIS. In some embodiments, an ATIS manufacturer may provide a hose support block and ATIS air hoses for a vehicle having TPMS. The hose support block and ATIS may be compatible with the manufacturer's ATIS. The hose support block and ATIS hoses may be installed on the vehicle. Later, when the vehicle is to be fitted with an ATIS, then the ATIS may be installed and a functioning rotary union may replace the hose support block. The first-provided ATIS air hoses thus need not be replaced and may be used with the functioning rotary union.

The disclosed hose support block may be used with any ATIS-capable vehicle having a tire at the end of an axle, such as class 7 and 8 trucks, passenger vehicles, cargo trucks, RVs, trailers, farm tractors, agricultural vehicles, and the like.

The one-way valves may be Schrader® valves or any other suitable normally-closed one-way valves.

By mounting or disposing a TPMS sensor on an air hose near a hose support block, the sensor may stay with the truck or trailer, and may remain further associated with a particular tire or tire position, rather than be removed when the tire is changed. As noted above, in the prior art, TPMS sensors are disposed on the tire stem or in the tire cavity or to each wheel. Thus, when a tire is changed, the TPMS sensor may be lost, damaged or simply not re-installed. And, for TPMS sensors that identify a particular wheel or location on the truck or trailer, failure to replace the TPMS sensor or installing the TPMS sensor on the wrong tire may result in erroneous data being transmitted to the TPMS system. Installing a TPMS sensor in or about the hose support block may avoid such issues.

Figure 28A:
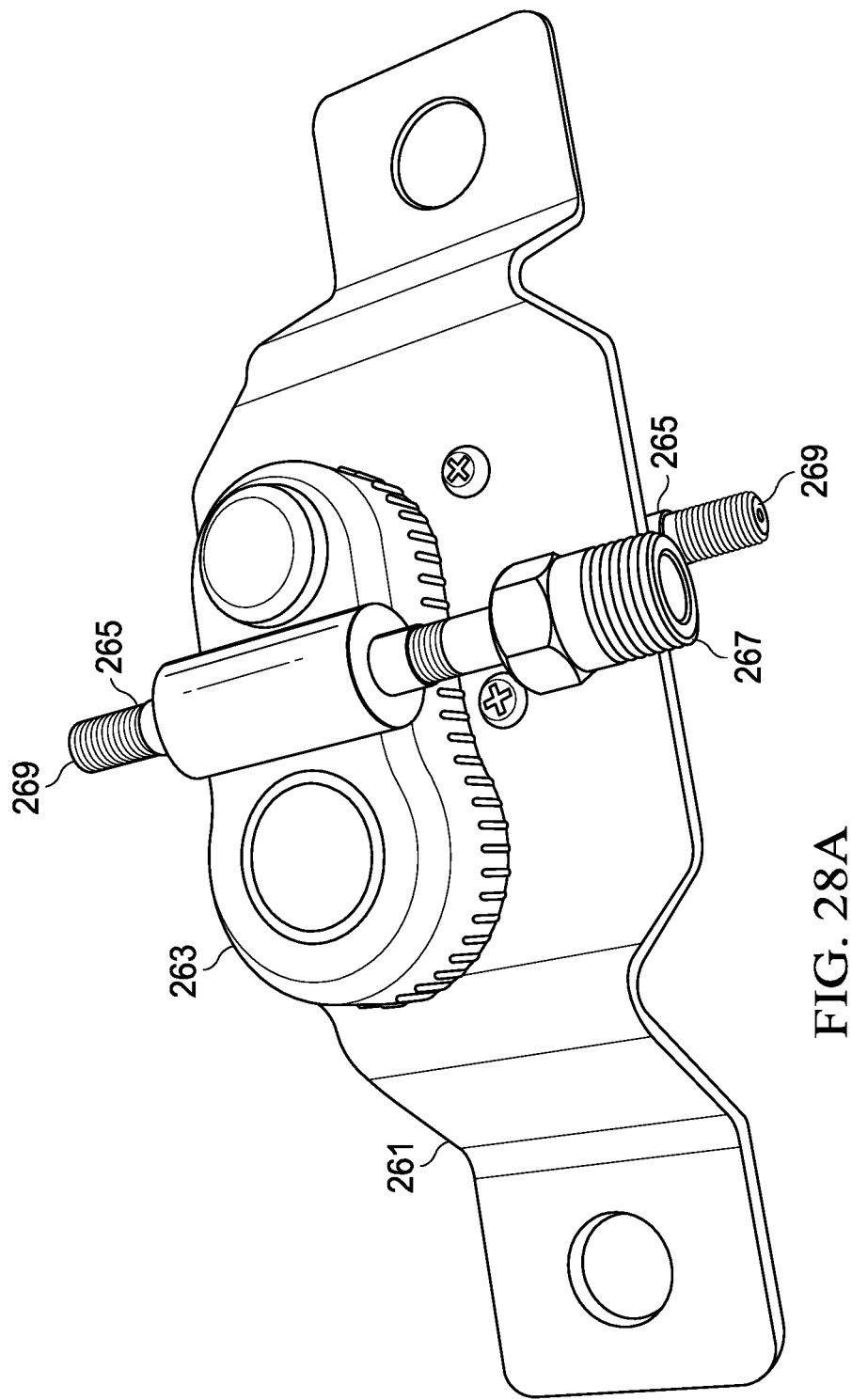
FIGS. 28A and 28B illustrates another embodiment of a hose block having two TPMS sensors mounted thereto.
Figure 28B:
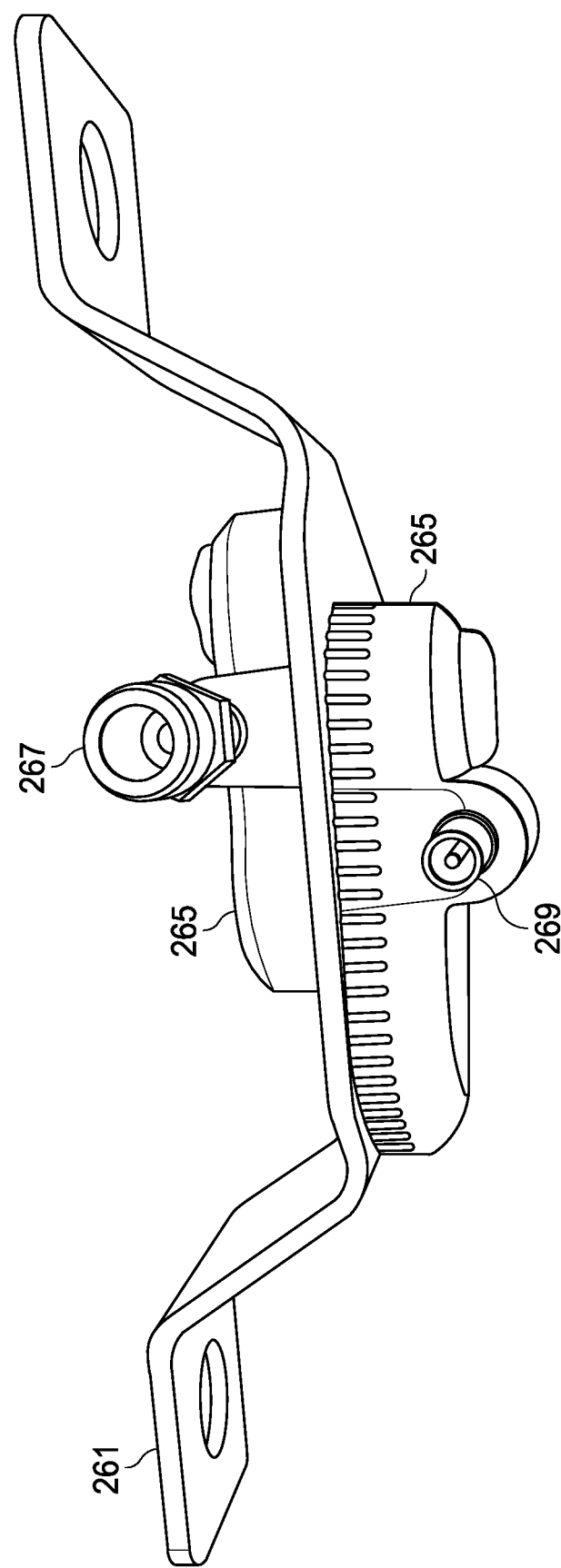

In some embodiments, a hose block may comprise a bracket, as in the embodiment of FIGS. 28A and 28B. In some embodiment a bracket 261 may be configured to mount to a wheel-end fastener, such as a lug stud, or a hub cap. In some embodiments, the bracket 261 may be configured for mounting to on a hub at a central location, such as on the axis of wheel rotation. The hose block may have one or more TPMS sensors 263 mounted thereto. In the disclosed embodiment, one TPMS sensor is mounted to each side of the bracket (see FIG. 28B). Each TPMS sensor may have a fluid conduit 265 disposed therein. The fluid conduit may comprise a fitting configured at a first end 267 for removable coupling to an air hose (not shown), such as a typical ATIS air hose. The air hose may be coupled to a tire valve as described above so as to place the TPMS sensor in fluid communication with a pneumatic tire (not shown). A second end 269 of the fluid conduit 265 may be configured like a typical tire valve stem so as to receive a pressurized fluid from a fluid source, such as shop air at a maintenance facility. A one-way check valve (not shown), such as a SCHRADER valve, may be disposed in the second end 269 of the valve.

Figure 29A:
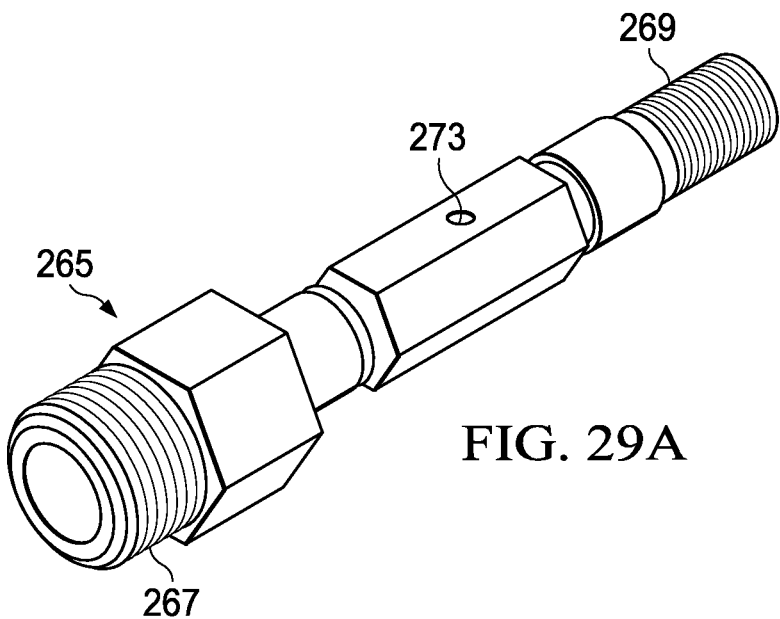
FIGS. 29A and 29B illustrate an embodiment of a fluid conduit configured for coupling a TPMS sensor to a pneumatic tire.
Figure 29B:
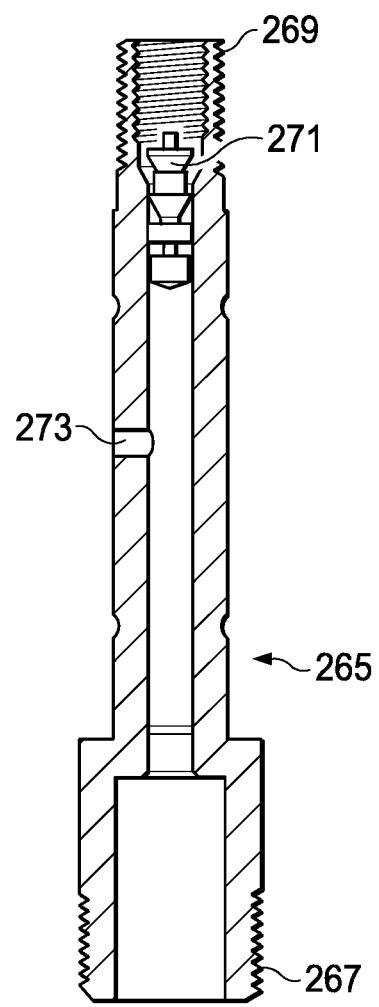

The fluid conduit 265 is shown in further detail in FIGS. 29A and 29B. The fluid conduit 265 may include the one-way check valve 271 in the second end 269. A fluid port 273 may provide fluid communication of pressurized fluid from the tire to the TPMS sensor, thus allowing the TPMS sensor to detect tire pressure. In some embodiments, the TPMS sensor may comprise a digital display (not shown) to provide a visual indication of tire pressure. The fluid conduit may be integral to the TPMS sensor, or the TPMS sensor may be permanently or removably coupled to the fluid port.

Figure 30:
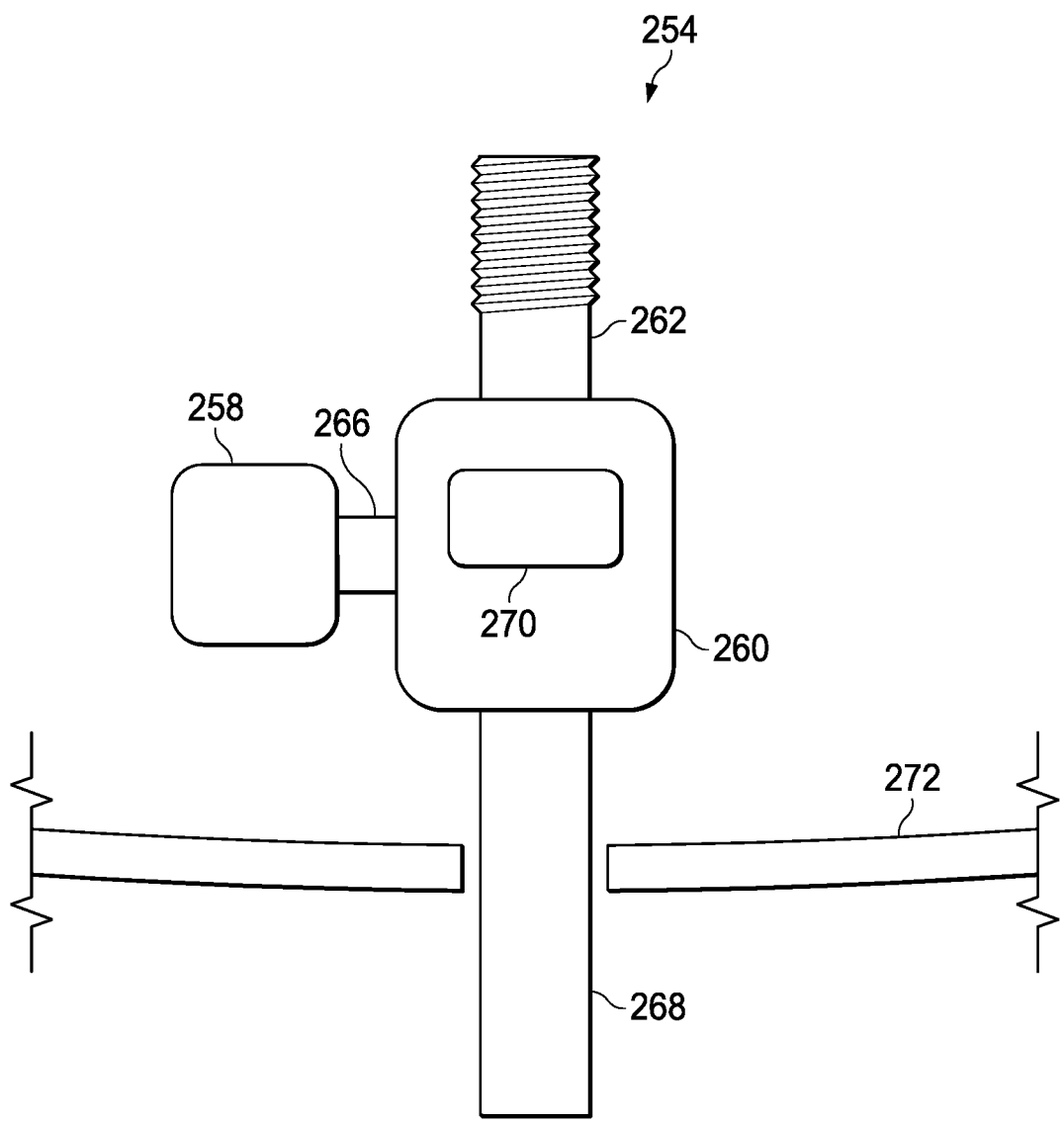
FIG. 30 illustrates a manifold with the gauge and TPMS sensor external to one another.

A pressure sensor may include a TPMS sensor and a pressure gauge for use on a vehicle, such as in connection with an inflation manifold or hose block, or with an air hose as described herein. Referring to FIG. 30, such a pressure sensor 254 may be coupled to the valve stem 268 mounted to a tire rim 272 so as to monitor the tire pressure. In other embodiments, the pressure sensor may be integrated with a valve stem 268. The system may also comprise a pass-through valve or conduit 262 configured to allow manual inflation of the tire by passing fluid through to the valve stem 268. Such pass-through valve or conduit may be configured for coupling to a shop air system or to any other tire inflation components that may be desired on the vehicle, such as an automatic tire inflation system or wheel-end-mounted inflation manifold. In some embodiments, the pressure gauge may comprise the pass-through fluid valve or conduit. In such embodiments, the pass-through fluid valve or conduit may comprise a port to which the TMPS sensor may be coupled.

Figure 31A:
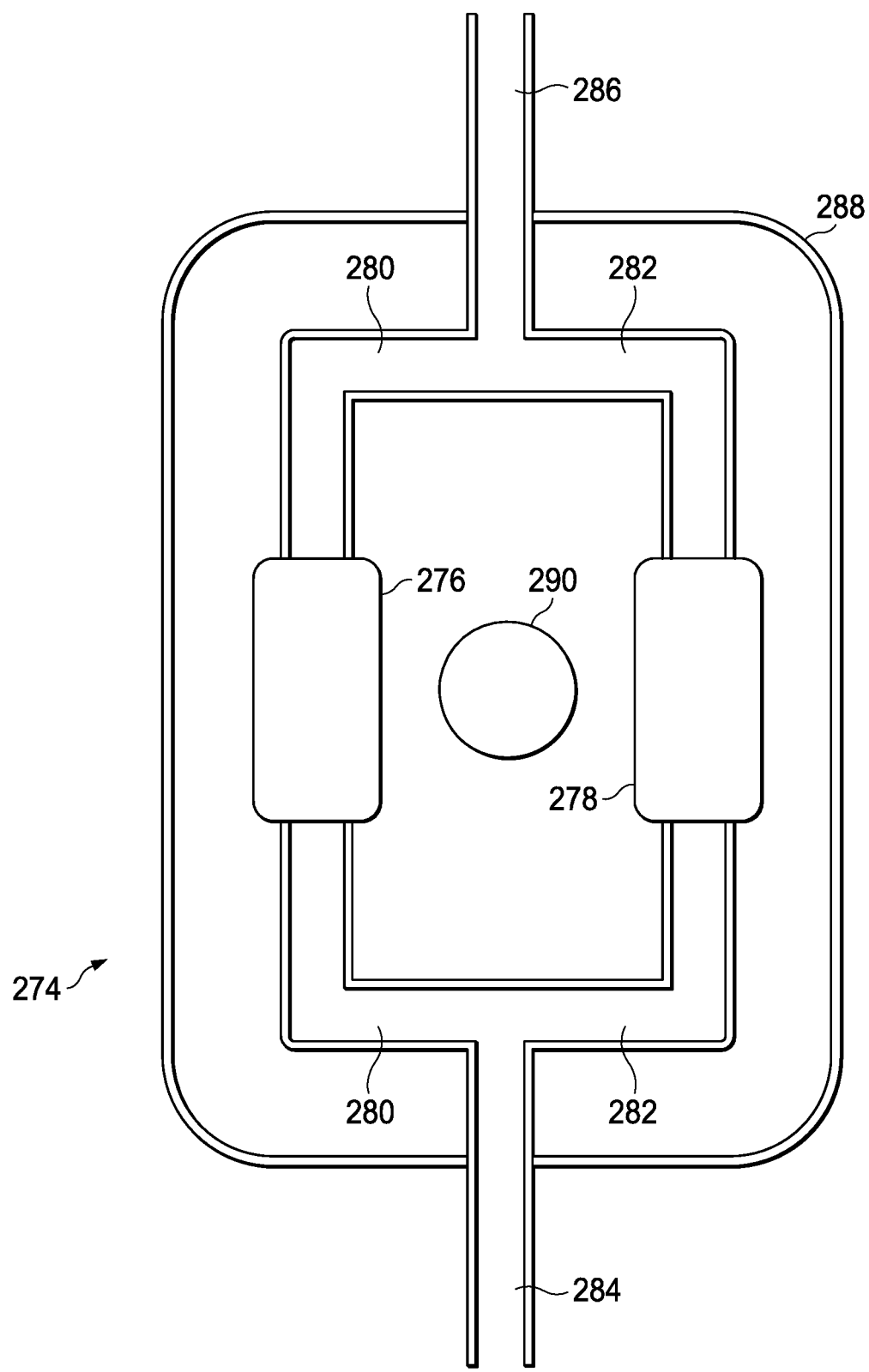
FIG. 31A illustrates a manifold with a pressure gauge and TPMS sensor combined in a shared housing.
Figure 31B:
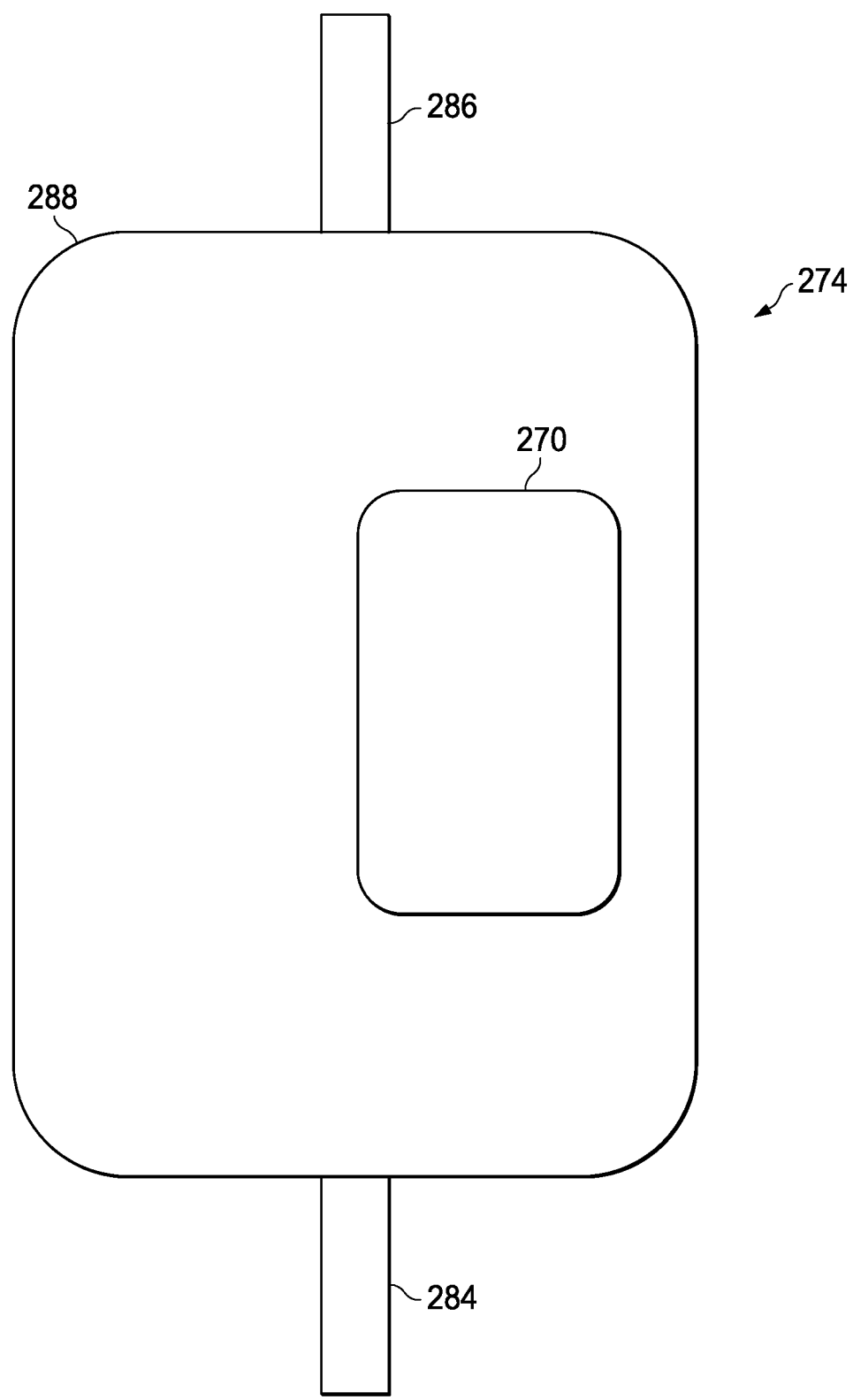
FIG. 31B illustrates the external view of the manifold in FIG. 29A.

Now referring to FIGS. 31A and 31B, such a pressure sensor 254 may comprise a TPMS sensor 258, a pressure gauge 260, and a set of connecting fluid conduits. There may be a first conduit section 262 configured like a tire valve stem so as to attach any other tire inflation systems that may be desired on the vehicle, such as air hoses as described above. The first fluid conduit section may be configured to permit fluid to pass to the pressure gauge 260 and to the tire valve stem 268. There may be a second conduit section 266 that connects the TPMS sensor 258 and the pressure gauge 260.

The pressure gauge 260 may be configured to sealingly couple to the tire valve stem 268. The gauge 260 may include a visual display configured to visually represent tire pressure. In other embodiments, the TPMS sensor 258 may comprise such a visual display. Such a visual display may be a digital screen 270 or may be an analog needle and dial.

As seen in FIGS. 31A and 31B, a flow-through TPMS sensor 276 that is combined with a flow-through pressure gauge 278 may be embodied as a single system 274 that connects to a tire valve stem 268 wherein the overall system 274 maintains a first fluid path 280 wherein a TPMS sensor 276 is disposed and a second fluid path 282 wherein a pressure gauge 278 is disposed wherein the paths 280 and 282 are formed by tubing, piping, or other fluid transport devices as found in the state of the art. The first and second fluid paths 280 and 282 may originate from a common feed path 284 and terminate in a common outlet path 286.

The system 274 may be packaged in a housing 288. The housing 288 may be constructed of a polymer or metallic substance such that the housing 288 is resistant to the environmental conditions seen by commercial vehicles. The housing may enclose all other components while allowing access to the common feed and outlet paths 284 and 286. Alternately, the system 274 may be packaged such that the TPMS sensor 276 and the gauge 278 are housed in separate enclosures. As some TPMS sensors 276 may require an onboard power source 290, a battery or other power source may be disposed inside the case. Alternate onboard power sources may include fuel cells, capacitors, dynamos located in a fluid flow path, and any other portable power source that may be known in the state of the art.

The common feed path 284 may be in fluid communication with the internal pressure of the tire and common outlet path 286 is in fluid communication with any other tire inflation related components or systems. The pressure gauge 278 may monitor tire pressure independent of The TPMS sensor 276 and allow for a second comparative pressure reading by which to evaluate the accuracy of the TPMS sensor 276 reading. The pressure gauge 278 may maintain a visual representation of the pressure reading such that a user may readily assess the tire pressure. Such a pressure gauge 278 may be an analog or digital device and maintain a display 270 appropriate to the sensing device of the gauge 278. For example, a digital gauge may maintain a numeric digital readout while an analog gauge may maintain a needle and dial style of readout. In addition to serving as a method of verifying the TPMS sensor 276 reading, the pressure gauge 278 also may allow a user to determine the severity of the low tire pressure event. Similarly, the TPMS sensor 276 may include a visual display. In some embodiments, a single visual display may be used to display tire pressure information from both the pressure gauge and the TPMS sensor.

Figure 32:
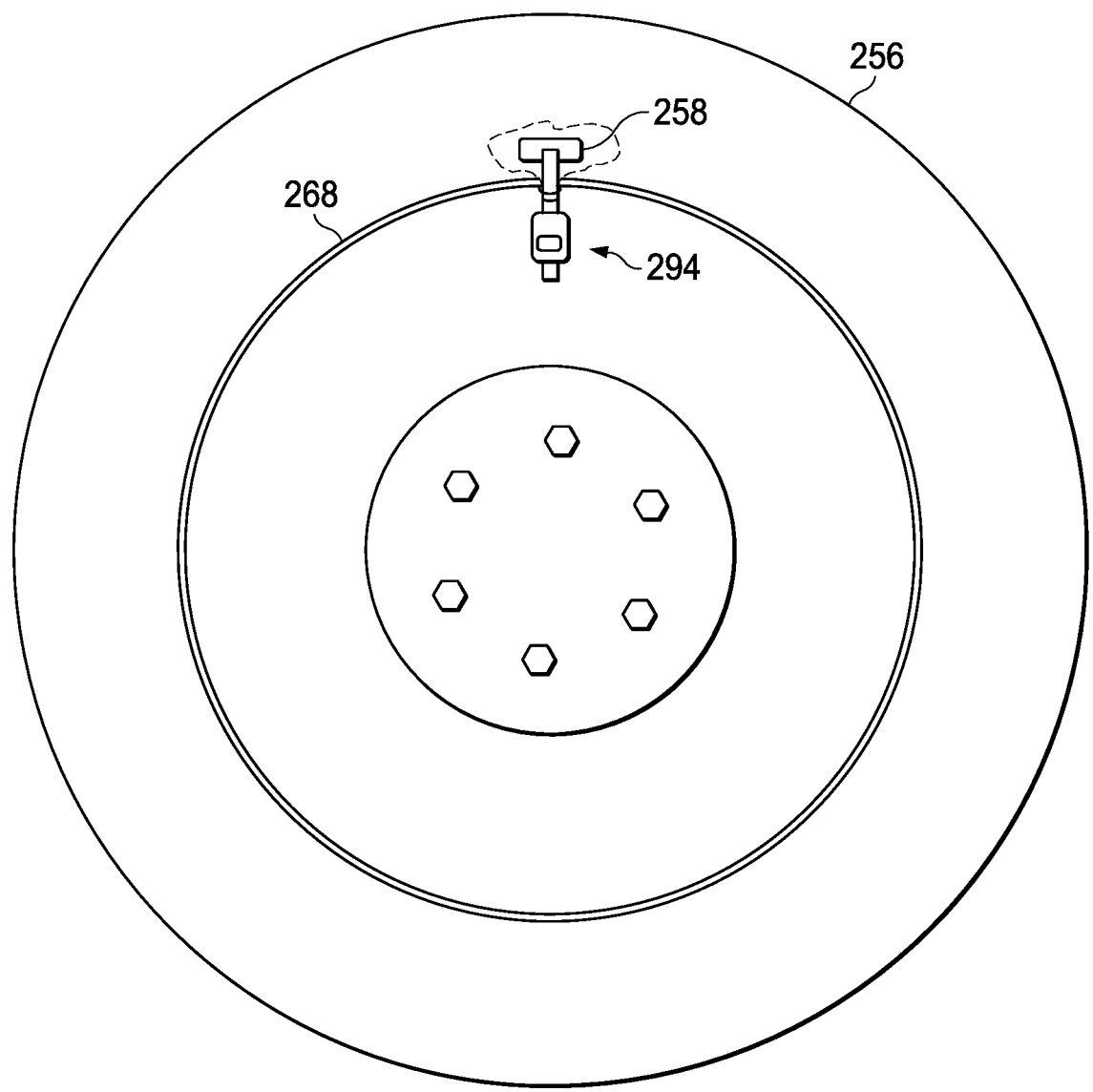
FIG. 32 illustrates an embodiment of a manifold mounted on a tire wherein the sensor is internal to the tire.
Figure 33:
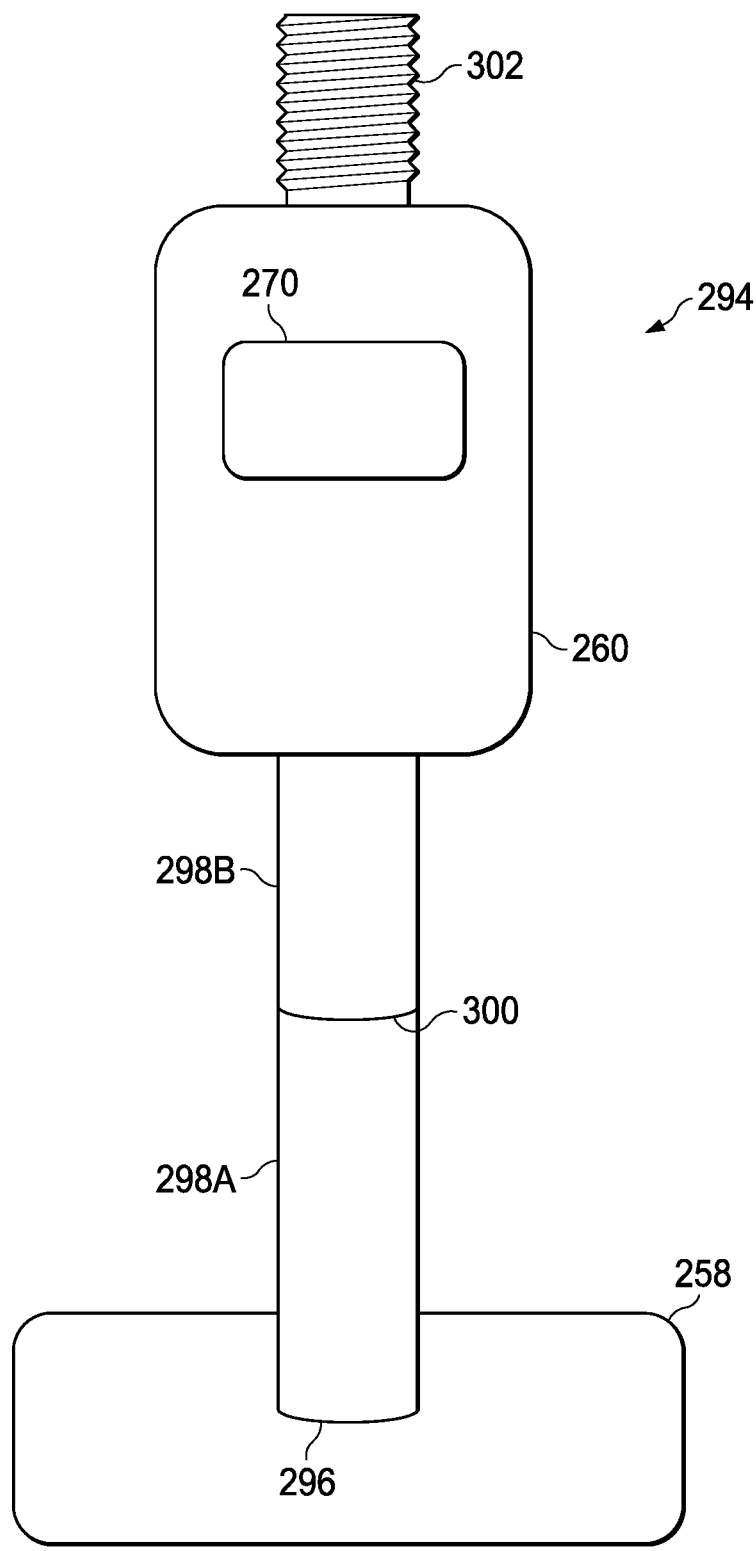
FIG. 33 illustrates a manifold wherein the TPMS sensor is internal to the tire and the gauge is external.

In another embodiment, as illustrated in FIG. 32, the system 294 may have the TPMS sensor 258 disposed internal to a tire 256. In such a configuration, as illustrated in FIGS. 32 and 33, the pressure sensor may comprise a TPMS sensor 258, integrated valve stem 298, gauge module 260, and threaded nozzle 302. The sensor 258 may collect data on internal tire pressure and wheel-end temperatures. The sensor 258 may be attached to an integrated valve stem 298 through which pressurized fluid may be provided to a tire 256 or released from a tire 256. A port 296 may be disposed at the terminal end of the valve stem 298 that resides inside the tire 256. The port 296 may act to allow fluid communication between the tire 256 and valve stem 298. In the simplest embodiment, the port 296 may be the open end of the valve stem tube 298. With the TPMS sensor 258 installed internal to the tire 256, the integrated valve stem 298 may pass through the tire rim 272. The valve stem 298 may have a gauge 260 disposed in the section of the valve stem 298 that is external to the tire 256. The gauge 260 may contain a display 270 to allow for visual communication of the collected TPMS sensor and/or pressure gauge data.

In some embodiments, the system valve stem 298 may be separable from the sensor 258 for the purpose of installation with a tire. Such a separable joint 300 may be disposed at the sensor-valve stem junction or may be disposed along the length of the valve stem 298. The latter design resulting in a sensor with a partial valve stem section 298A and a gauge display with a partial valve stem section 298B, that when mated together form a full valve stem 298.

The display 270 may be a LED or LCD screen that provides a visual representation of the tire pressure. Based on the data gathered from the display, a user may be able decide between alternate courses of action depending on the severity of the tire conditions. Such actions may include whether to continue to the nearest maintenance facility, immediately attempt to refill the tire, or that an immediate tire change may be warranted. With the minimal data of a low-pressure alarm being triggered, as is with most TPMS modules, the user may not have the data required to make an informed decision as to the optimal course of action. This lack of on-hand data may result in generalized policies and procedures being written for or by users and thus likely lead to situations in which the most efficient solution was not implemented. Additionally, for users without defined policies in place, time may be wasted in contemplating the best course of action due to the lack of data on which to make such a decision.

The inflation manifold may thus be variously embodied, and wheel end assemblies may thus be variously formed, as described in the following clauses:

1. An inflation manifold comprising a first fluid channel having a first inlet and a first outlet, the first inlet configured for sealing connection to a first tire; and a second fluid channel having a second inlet and a second outlet, the second inlet configured for sealing connection to a second tire.
2. The inflation manifold of clause 1 further comprising a first normally-closed one-way valve disposed at the first outlet so as to prevent fluid from flowing from the manifold when closed; and a second normally-closed one-way valve disposed at the second outlet so as to prevent fluid from flowing from the manifold when closed.
3. The inflation manifold of clause 2, wherein the first normally-closed one-way valve and the second normally-closed one-way valve are automobile tire valves.
4. The inflation manifold of clause 2 further comprising a first valve stem disposed in the first outlet, the first normally-closed one-way valve being disposed in the first valve stem; and a second valve stem disposed in the second outlet, the second normally-closed one-way valve being disposed in the second valve stem.
5. The inflation manifold of clauses 1, 2, 3 or 4 further comprising a first fitting disposed in the first inlet and being configured for removable coupling to a first fluid conduit, and a second fitting disposed in the second inlet and being configured for removable coupling to a second fluid conduit.
6. The inflation manifold of clause 5, the first fitting comprising a first actuator post; and the second fitting comprising a second actuator post.
7. The inflation manifold of clause 5 further comprising a first fitting valve disposed in the first fitting, the first fitting valve comprising a normally-closed one-way valve and disposed so as to prevent fluid from flowing from the manifold when closed; and a second fitting valve disposed in the second fitting, the second fitting valve comprising a normally-closed one-way valve and disposed so as to prevent fluid from flowing from the manifold when closed.
8. The inflation manifold of clause 7, the first fitting valve comprising a first actuator post; and the second fitting valve comprising a second actuator post.
9. The inflation manifold of clause 8, the first fitting valve comprising a first fluid channel disposed so as to allow fluid to flow through the first fluid channel when the first fitting valve is open; and the second fitting valve comprising a second fluid channel disposed so as to allow fluid to flow through the second fluid channel when the second fitting valve is open.
10. The inflation manifold of clause 1 further comprising a top face, a bottom face and one or more side faces, the first inlet and second inlet each being disposed on one of the one or more side faces, and the first outlet and second outlet each being disposed on the top face.
11. The inflation manifold of clause 10, the bottom face being configured for removably mounting to a hubcap.
12. The inflation manifold of clause 10, the bottom face being configured for removably mounting to bracket mounted to a hub.
13. The inflation manifold of clause 1 further comprising a top face, a bottom face and one or more side faces, the first inlet, second inlet, first outlet and second outlet each being disposed on one of the one or more side faces.
14. The inflation manifold of clauses 10 or 13, the inflation manifold being in the shape of a cylinder.
15. The inflation manifold of clauses 10 or 13, the inflation manifold being in the shape of a cube.
16. The inflation manifold of clause 1 further comprising one or more faces, the first inlet, second inlet, first outlet and second outlet each being disposed on one of the one or more side faces.
17. The inflation manifold of clause 14, further comprising a groove disposed circumferentially around the cylinder curve; a radial fluid channel extending from the groove to the central axis of the inflation manifold; an axial fluid channel extending from the bottom face to the radial fluid channel; and an annular seal disposed in the groove so as to seal the radial fluid channel, the annular seal configured to flex out of the groove to relieve fluid pressure in the radial fluid channel.
18. The inflation manifold of clause 1, the first fluid channel comprising a first port, and the second fluid channel comprising a second port.
19. The inflation manifold of clause 18, further comprising a first tire pressure sensor disposed at the first port; and a second tire pressure sensor disposed at the second port.
20. The inflation manifold of clause 19, wherein the first tire pressure sensor is disposed in the first port and the second tire pressure sensor is disposed in the second port.
21. The inflation manifold of clause 19, wherein the first tire pressure sensor is removably disposed at the first port and the second tire pressure sensor is removably disposed at the second port.
22. The inflation manifold of clause 19, wherein the first tire pressure sensor is removably coupled to the first port and the second tire pressure sensor is removably coupled to the second port.
23. The inflation manifold of clause 18, further comprising a first normally-closed one-way valve disposed at the first outlet so as to prevent fluid from flowing from the manifold when closed; a second normally-closed one-way valve disposed at the second outlet so as to prevent fluid from flowing from the manifold when closed; a first valve stem disposed in the first outlet, the first normally-closed one-way valve being disposed in the first valve stem; a second valve stem disposed in the second outlet; a third valve stem disposed in the first port; and a fourth valve stem disposed in the second port.
24. The inflation manifold of clause 23, further comprising a first tire pressure sensor coupled to the third valve stem; and a second tire pressure sensor coupled to the fourth valve stem.
25. The inflation manifold of clause 24, further comprising a third normally-closed one-way valve disposed in the third valve stem so as to prevent fluid from flowing from the manifold when closed; a fourth normally-closed one-way valve disposed in the fourth valve stem so as to prevent fluid from flowing from the manifold when closed; the first tire pressure monitor having a first actuator disposed so as to open the third normally closed valve when the first tire pressure monitor is coupled to the third valve stem; and the second tire pressure monitor having a second actuator disposed so as to open the fourth normally closed valve when the second tire pressure monitor is coupled to the fourth valve stem.
26. The inflation manifold of clause 1, further comprising a first tire pressure sensor disposed in the first fluid channel; and a second tire pressure sensor disposed in the second fluid channel.
27. The inflation manifold of clause 20, further comprising a first cover sealing the first tire pressure sensor in the first port; and a second cover sealing the second tire pressure sensor in the second port.
28. The inflation manifold of clause 20, wherein the first tire pressure sensor is sealed in the first port and the second tire pressure sensor is sealed in the second port, each by a sealing compound.
29. The inflation manifold of clause 28, the sealing compound comprising epoxy.
30. The inflation manifold of clause 20, further comprising a visual display configured to display first tire pressure data from the first tire pressure sensor, second tire pressure data from the second tire pressure sensor, or both the first tire pressure data and the second tire pressure data.
31. The inflation manifold of clause 17, the annular seal comprising an o-ring.
32. The inflation manifold of clause 1, further comprising a bottom face configured for removably mounting to a hub cap having one or more vents, the bottom face comprising pressure-relief channels disposed so as to permit fluid to flow from the vents to atmosphere when the inflation manifold is mounted to the hubcap.
33. The inflation manifold of clause 32, further comprising a shroud mounted to the bottom surface so as to seal the vents when the inflation manifold is mounted to the hubcap.
34. The inflation manifold of clause 33, wherein the shroud is flexible so as to allow pressurized fluid to escape the vents.
35. A wheel-end assembly having a hub, a first pneumatic tire and a second pneumatic tire, the wheel-end assembly comprising an inflation manifold comprising a first fluid channel having a first inlet and a first outlet, and a second fluid channel having a second inlet and a second outlet; and a first fluid conduit providing sealed fluid communication between first inlet and the first pneumatic tire; and a second fluid conduit providing sealed fluid communication between second inlet and the second pneumatic tire.

36. The wheel end assembly of clause 35, wherein the inflation manifold is mounted to the hub.

37. The wheel end assembly of clause 35, wherein the inflation manifold is mounted to a hubcap mounted to the hub.

38. The wheel end assembly of clause 35, wherein the inflation manifold is mounted to a bracket mounted to the hub.

39. The wheel end assembly of clause 35, wherein the first fluid conduit is removably coupled to the first inlet and the first pneumatic tire, and the second fluid conduit is removably coupled to the second inlet and the second pneumatic tire.

40. The wheel end assembly of clause 35, wherein the first fluid conduit is removably coupled to a first valve stem of the first pneumatic tire, and the second fluid conduit is removably coupled to a second valve stem of the second pneumatic tire, the first valve stem and the second valve stem each having an automobile tire valve disposed therein.

41. The wheel end assembly of clause 40, wherein the first fluid conduit and the second fluid conduit each comprise a post configured to open the automobile tire valve when the conduit is coupled to the valve stem.

42. The wheel end assembly of clause 35, the inflation manifold further comprising a first normally-closed one-way valve disposed at the first outlet so as to prevent fluid from flowing from the manifold when closed; and a second normally-closed one-way valve disposed at the second outlet so as to prevent fluid from flowing from the manifold when closed.

43. The wheel end assembly of clause 42, wherein the first normally-closed one-way valve and the second normally-closed one-way valve are automobile tire valves.

44. The wheel end assembly of clause 42, further comprising a first valve stem disposed in the first outlet, the first normally-closed one-way valve being disposed in the first valve stem; and a second valve stem disposed in the second outlet, the second normally-closed one-way valve being disposed in the second valve stem.

45. The wheel end assembly of clauses 35, 42, 43 or 44, further comprising a first fitting disposed in the first inlet and being configured for removable coupling to a first fluid conduit, and a second fitting disposed in the second inlet and being configured for removable coupling to a second fluid conduit.

46. The wheel end assembly of clause 45, the first fitting comprising a first actuator post; and the second fitting comprising a second actuator post.

47. The wheel end assembly of clause 45 further comprising a first fitting valve disposed in the first fitting, the first fitting valve comprising a normally-closed one-way valve and disposed so as to prevent fluid from flowing from the manifold when closed; and a second fitting valve disposed in the second fitting, the second fitting valve comprising a normally-closed one-way valve and disposed so as to prevent fluid from flowing from the manifold when closed.

48. The wheel end assembly of clause 47, the first fitting valve comprising a first actuator post; and the second fitting valve comprising a second actuator post.

49. The wheel end assembly of clause 48, the first fitting valve comprising a first fluid channel disposed so as to allow fluid to flow through the first fluid channel when the first fitting valve is open; and the second fitting valve comprising a second fluid channel disposed so as to allow fluid to flow through the second fluid channel when the second fitting valve is open.

50. The wheel end assembly of clause 35, the inflation manifold further comprising a top face, a bottom face and one or more side faces, the first inlet and second inlet each being disposed on one of the one or more side faces, and the first outlet and second outlet each being disposed on the top face.

51. The wheel end assembly of clause 50, the bottom face being configured for removably mounting to a hubcap.

52. The wheel end assembly of clause 50, the bottom face being configured for removably mounting to bracket mounted to a hub.

53. The wheel end assembly of clause 35, the inflation manifold further comprising a top face, a bottom face and one or more side faces, the first inlet, second inlet, first outlet and second outlet each being disposed on one of the one or more side faces.

54. The wheel end assembly of clauses 50 or 53, the inflation manifold being in the shape of a cylinder.

55. The wheel end assembly of clauses 50 or 53, the inflation manifold being in the shape of a cube.

56. The wheel end assembly of clause 35 further comprising one or more faces, the first inlet, second inlet, first outlet and second outlet each being disposed on one of the one or more side faces.

57. The wheel end assembly of clause 54, the inflation manifold further comprising a groove disposed circumferentially around the cylinder curve; a radial fluid channel extending from the groove to the central axis of the inflation manifold; an axial fluid channel extending from the bottom face to the radial fluid channel; and an annular seal disposed in the groove so as to seal the radial fluid channel, the annular seal configured to flex out of the groove to relieve fluid pressure in the radial fluid channel.

58. The wheel end assembly of clause 35, the first fluid channel comprising a first port, and the second fluid channel comprising a second port.

59. The wheel end assembly of clause 58, further comprising a first tire pressure sensor disposed at the first port; and a second tire pressure sensor disposed at the second port.

60. The wheel end assembly of clause 59, wherein the first tire pressure sensor is disposed in the first port and the second tire pressure sensor is disposed in the second port.

61. The wheel end assembly of clause 59, wherein the first tire pressure sensor is removably disposed at the first port and the second tire pressure sensor is removably disposed at the second port.

62. The wheel end assembly of clause 59, wherein the first tire pressure sensor is removably coupled to the first port and the second tire pressure sensor is removably coupled to the second port.

63. The wheel end assembly of clause 58 further comprising a first normally-closed one-way valve disposed at the first outlet so as to prevent fluid from flowing from the manifold when closed; a second normally-closed one-way valve disposed at the second outlet so as to prevent fluid from flowing from the manifold when closed; a first valve stem disposed in the first outlet, the first normally-closed one-way valve being disposed in the first valve stem; a second valve stem disposed in the second outlet; a third valve stem disposed in the first port; and a fourth valve stem disposed in the second port.

64. The wheel end assembly of clause 63, further comprising a first tire pressure sensor coupled to the third valve stem; and a second tire pressure sensor coupled to the fourth valve stem.

65. The wheel end assembly of clause 64, further comprising a third normally-closed one-way valve disposed in the third valve stem so as to prevent fluid from flowing from the manifold when closed; a fourth normally-closed one-way valve disposed in the fourth valve stem so as to prevent fluid from flowing from the manifold when closed; the first tire pressure monitor having a first actuator disposed so as to open the third normally closed valve when the first tire pressure monitor is coupled to the third valve stem; and the second tire pressure monitor having a second actuator disposed so as to open the fourth normally closed valve when the second tire pressure monitor is coupled to the fourth valve stem.

66. The wheel end assembly of clause 35, further comprising a first tire pressure sensor disposed in the first fluid channel; and a second tire pressure sensor disposed in the second fluid channel.

67. The wheel end assembly of clause 60, further comprising a first cover sealing the first tire pressure sensor in the first port; and a second cover sealing the second tire pressure sensor in the second port.

68. The wheel end assembly of clause 60, wherein the first tire pressure sensor is sealed in the first port and the second tire pressure sensor is sealed in the second port, each by a sealing compound.

69. The wheel end assembly of clause 68, the sealing compound comprising epoxy.

70. The wheel end assembly of clause 57, the annular seal comprising an o-ring.

71. The wheel end assembly of clause 35, further comprising a bottom face configured for removably mounting to a hub cap having one or more vents, the bottom face comprising pressure-relief channels disposed so as to permit fluid to flow from the vents to atmosphere when the inflation manifold is mounted to the hubcap.

72. The wheel end assembly of clause 71, further comprising a shroud mounted to the bottom surface so as to seal the vents when the inflation manifold is mounted to the hubcap.

73. The wheel end assembly of clause 72, wherein the shroud is flexible so as to allow pressurized fluid to escape the vents.

74. An apparatus comprising a hose support block; an air hose coupled at one end to a pneumatic tire valve stem and at a second end to the hose support block; and a tire pressure monitoring system sensor coupled to the air hose so as to sense the pressure of fluid in the air hose.

75. The apparatus of clause 74, the hose support block comprising a dummy component of an automatic tire inflation system.

76. The apparatus of clause 75, the dummy component comprising a rotary fluid connection housing.

77. The apparatus of clause 74, the air hose being in free fluid communication with pressurized fluid in the pneumatic tire.

78. The apparatus of clause 77, the air hose comprising a TPMS sensor.

79. The apparatus of clause 77, the air hose comprising an auxiliary port.

80. The apparatus of clause 79 further comprising a TPMS sensor coupled to the auxiliary port.

81. The apparatus of clause 79 further comprising a pressure relief valve coupled to the auxiliary port.

82. The apparatus of clause 79, the auxiliary port being configured to couple to a fluid pressure source so as to permit pressurization of the pneumatic tire.

83. The apparatus of clause 74 configured for mounting to a hubcap.

84. The apparatus of clause 74 configured for mounting to a hubcap.

85. An apparatus comprising a hose support block and a first TPMS sensor mounted to the hose support block, the first TPMS sensor comprising a first fluid conduit having a first end configured to removably couple to a first air hose and a second end having a first one-way check valve disposed therein, the first fluid conduit further comprising a first fluid port disposed so as to place the TPMS sensor in sensing fluid communication with fluid in the first fluid conduit.

86. The apparatus of clause 85, further comprising a second TPMS sensor mounted to the hose support block, the second TPMS sensor comprising a second fluid conduit having a first end configured to removably couple to a second air hose and a second end having a second one-way check valve disposed therein, the second fluid conduit further comprising a second fluid port disposed so as to place the TPMS sensor in sensing fluid communication with fluid in the second fluid conduit.

87. The apparatus of clause 86, the hose support block comprising a bracket configured for mounting to a wheel end.

88. The apparatus of clause 87, the bracket being configured for mounting to a wheel-end hub on the axis of hub rotation.

89. A tire pressure sensor comprising a tire pressure gauge configured for mounting to a tire valve, the tire pressure gauge comprising a visual tire pressure indicator; and a tire pressure monitoring system (TPMS) sensor in sealing fluid communication with the flow-through tire pressure gauge.

90. The sensor of clause 89, the tire pressure gauge being a flow-through tire pressure gauge comprising a visual pressure indicator responsive to tire pressure; and a fluid channel in fluid communication with the visual pressure indicator, the fluid channel having a first end and a second end, the first end having a tire valve sealingly disposed therein, and the second end having a post configured to hold open the valve of a tire stem when mounted thereto.

91. The sensor of clause 90, wherein the visual pressure indicator is digital.

92. The sensor of clause 89, the tire pressure gauge comprising a flow-through tire pressure gauge having an auxiliary port, and the TPMS sensor being coupled to the auxiliary port.

93. The sensor of clause 89 comprising a fluid channel having a first end and a second end, the first end having a tire valve sealingly disposed therein, and the second end having a post configured to hold open the valve of a tire stem when mounted thereto, the tire pressure gauge and the TPMS sensor each being in sealing fluid communication with the fluid channel between the first end and the second end thereof.

94. The sensor of clause 93, the tire pressure gauge comprising a visual pressure indicator responsive to tire pressure.

95. The sensor of clause 94, wherein the visual pressure indicator is digital.

96. A tire valve stem comprising a fluid channel having a first end and a second end, the first end having a tire valve sealingly disposed therein, and the second end being configured for mounting to a tire rim; a tire pressure gauge comprising a visual tire pressure indicator and being in sealing fluid communication with the fluid channel between the first end and the second end thereof; and a tire pressure monitoring system (TPMS) sensor in sealing fluid communication with the fluid channel.

97. The tire valve stem of clause 96, the tire pressure gauge being a flow-through tire pressure gauge having the fluid channel extending therethrough.

98. The tire valve stem of clause 97, the fluid channel having an auxiliary port, and the TPMS sensor being coupled to the auxiliary port.

99. The tire valve stem of clause 98, the tire pressure gauge comprising a visual pressure indicator responsive to tire pressure.

100. The tire valve stem of clause 99, wherein the visual pressure indicator is digital.

101. The tire valve stem of clause 96, the tire pressure monitoring system sensor being in sealing fluid communication with the fluid channel between the first end and the second end thereof.

102. The tire valve stem of clause 96, the tire pressure monitoring system sensor being in sealing fluid communication with the fluid channel at the second end thereof.

Although the present disclosure and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. For example, although the disclosed apparatus, systems and methods may be described with reference to a manual or manually-activated pressure reduction valve, an electric valve or other automatic electronic or mechanical valve may be used to accomplish relatively rapid reduction of air pressure. Accordingly, the appended claims are intended to include within their scope such processes, machines, manufacture, compositions of matter, means, methods, systems or steps.

We claim:

1. An apparatus comprising:
   a bracket configured for mounting at a hub of a wheel end of a vehicle; and
   a first tire pressure monitoring system sensor having a first hose fitting coupled thereto, the first hose fitting configured for coupling to a first air hose, the first air hose being extendable from a first pneumatic tire valve stem of the wheel end;
   the first tire pressure monitoring system sensor being mounted to the bracket so as to position the first tire pressure monitoring system sensor away from the first pneumatic tire valve stem when the bracket is mounted at the hub.

2. The apparatus of claim 1 further comprising:
   a second tire pressure monitoring system sensor having a second hose fitting coupled thereto, the second hose fitting configured for coupling to a second air hose, the second air hose being extendable from a second pneumatic tire valve stem of the wheel end,
   the second tire pressure monitoring system sensor being mounted to the bracket so as to position the second tire pressure monitoring system sensor away from the second pneumatic tire valve stem when the bracket is mounted at the hub.

3. The apparatus of claim 2, the first tire pressure monitoring system sensor and second tire pressure monitoring system sensor each being a flow-through sensor.

4. The apparatus of claim 1, the first tire pressure monitoring system sensor being associated with a first tire or a first tire position at the wheel end of the vehicle, the bracket being further configured to remain mounted to the vehicle when the first tire is removed from the wheel end.

5. The apparatus of claim 2, the first tire pressure monitoring system sensor and second tire pressure monitoring system sensor each being associated with a different tire or different tire position at the wheel end of the vehicle, the bracket being further configured to remain mounted to the vehicle when one or more pneumatic tires are removed from the wheel end.

6. The apparatus of claim 5, the vehicle having a tire pressure monitoring system, each of the first and second tire pressure monitoring system sensors being configured to wirelessly communicate a tire pressure data in the tire pressure monitoring system.

7. The apparatus of claim 1, further comprising the first air hose, the first air hose being coupled to the first hose fitting.

8. The apparatus of claim 7, the first air hose being an automatic tire inflation system air hose.

9. The apparatus of claim 8, the first air hose being configured to hold open the first pneumatic tire valve stem when coupled thereto.

10. The apparatus of claim 7, the first air hose comprising an auxiliary port, the auxiliary port having a one-way valve disposed therein so as to prevent pressurized fluid escaping from the first air hose.

* * * * *